(12) United States Patent
Dube et al.

(10) Patent No.: US 11,981,267 B2
(45) Date of Patent: May 14, 2024

(54) METHODS FOR BALLISTIC SHOCK ISOLATION OF NON HARDENED CAMERA SYSTEMS

(71) Applicant: BAE Systems Information and Electronic Systems Integration Inc., Nashua, NH (US)

(72) Inventors: Mark J. Dube, McDade, TX (US); William J. Elliott, Kyle, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/918,200

(22) PCT Filed: Nov. 23, 2021

(86) PCT No.: PCT/US2021/060433
§ 371 (c)(1),
(2) Date: Oct. 11, 2022

(87) PCT Pub. No.: WO2023/096628
PCT Pub. Date: Jun. 1, 2023

(65) Prior Publication Data
US 2023/0158969 A1  May 25, 2023

(51) Int. Cl.
| | |
|---|---|
| B60R 11/04 | (2006.01) |
| F16F 7/09 | (2006.01) |
| F16F 15/02 | (2006.01) |
| F16F 15/04 | (2006.01) |

(52) U.S. Cl.
CPC ............... B60R 11/04 (2013.01); F16F 7/09 (2013.01); F16F 15/022 (2013.01); F16F 15/046 (2013.01)

(58) Field of Classification Search
CPC ................................. F16F 7/09; F16F 15/046
See application file for complete search history.

(56) References Cited

U.S. PATENT DOCUMENTS

| | | | | |
|---|---|---|---|---|
| 2,588,682 A | * | 3/1952 | Wyeth | B60G 13/04 |
| | | | | 403/166 |
| 3,229,951 A | * | 1/1966 | Quick | F16F 3/04 |
| | | | | 267/136 |
| 4,362,287 A | | 12/1982 | Grongstad | |
| 2018/0370602 A1 | | 12/2018 | Norrman | |

FOREIGN PATENT DOCUMENTS

| | | | |
|---|---|---|---|
| CN | 112304308 A | * | 2/2021 |
| KR | 102138586 B1 | | 7/2020 |
| SU | 1115965 A1 | * | 9/1984 |

OTHER PUBLICATIONS

International Search Report, PCT/US21/60433, dated Aug. 1, 2022, 10 pages.

* cited by examiner

*Primary Examiner* — Melody M Burch
(74) *Attorney, Agent, or Firm* — Gary McFaline; Sand, Sebolt & Wernow LPA

(57) ABSTRACT

An apparatus for dampening at least one optical instrument on a military platform. The apparatus includes a plate adapted to hold at least one optical instrument. The apparatus also includes at least one dampening assembly having a first end operably engaged with the plate and an opposing second end operably engaged with a platform. The at least one dampening assembly is also adapted to reduce the movement of the plate and optical device from a ballistic event created by a ballistic device on the platform.

16 Claims, 11 Drawing Sheets

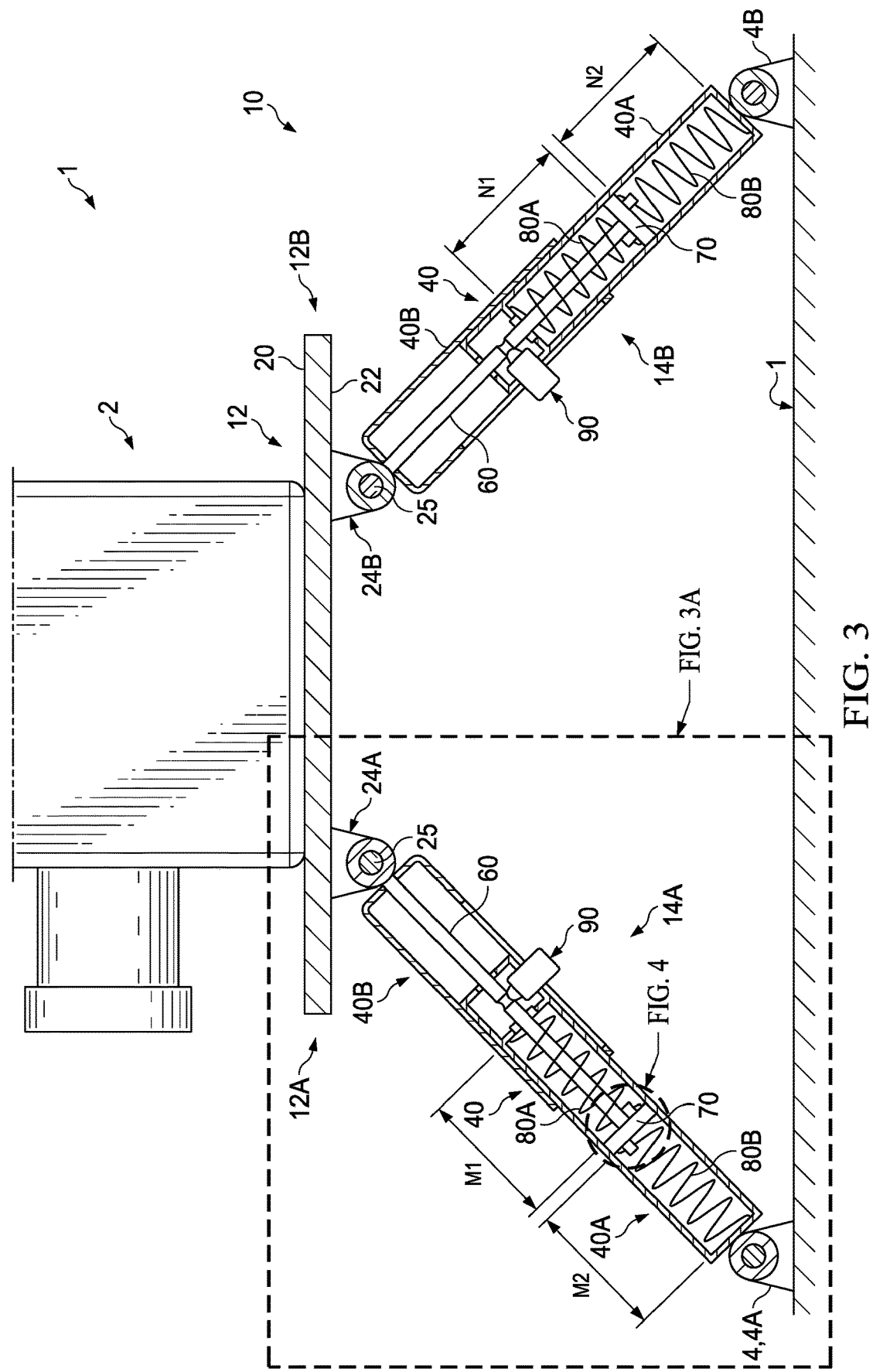

METHODS FOR BALLISTIC SHOCK ISOLATION OF NON HARDENED CAMERA SYSTEMS

TECHNICAL FIELD

The present disclosure generally relates to platform defense systems. More particularly, the present disclosure relates to ballistic shock isolation systems on a military platform. Specifically, the present disclosure relates to at least one apparatus for dampening and reducing ballistic shock to an optical instrument on a military platform.

BACKGROUND

Ballistic shock is a high-level shock that generally results from the impact of projectiles or ordnance on or near military platforms, such as armored combat vehicles. During these events, military platforms must be able to withstand these ballistics shocks from large caliber non-perforating projectiles, mine blasts, overhead artillery attacks, and other ballistic events while still retaining their combat mission capabilities. As such, the components and assemblies provided on these military platforms must be able to withstand these ballistics through certain mechanisms Generally, military platforms may include optical instruments and/or devices systems (e.g., camera systems) for various reasons, including situational awareness and assisting the operator in providing adequate viewing capability when operating a military platform. Currently, military platforms commonly utilize multi-spectral systems that use long wave infrared with visible spectrum cameras, which limits the pool of selecting viable optical instruments to withstand against high-level shock. During military operations, these optical systems must be capable of withstanding high-level shock from ballistic devices while continuing to operate during the course of the military operations. As such, these optical systems must have shock requirements in order to prevent damage to internal components such as electronic circuit card assemblies, optics, and other components and devices provided inside of each optical instrument. However, these shock requirements limit the options available to adequately design cost effective optical systems.

Moreover, mechanical apparatuses and systems may be used to combat these issues for providing ballistic shock resistance to optical systems. In one instance, the optical systems may be mounted to rails separated by wound wire ropes for shock resistance. While this mechanical apparatus is viable for protecting electronics during a ballistic shock, the optical instrument may sway and oscillate in a dynamic (i.e., vibration) environment hampering the driver's ability to receive data from these optical instrument (i.e., cause motion sickness, disorientation, etc.). Further, the rail and wound wire rope apparatus may be ineffective at viewing distant object due to the optical instrument being loosely affixed between the rail and wound wire rope. Moreover, this rail and wound wire rope apparatus may lead to motion sickness or causing disorientation to the operator of the military platform when operating and driving said military platform.

SUMMARY

The presently disclosed apparatuses for ballistic shock isolation provide military platforms with mechanisms for dampening and isolating ballistic shock from optical instruments. The disclosed apparatuses may also reduce the swaying and oscillating of the optical instruments during non-ballistic events to prevent against motion sickness or disorientation when operating the military platform. As such, the apparatuses disclosed herein address some of the inadequacies of previously known techniques and apparatuses for combating against ballistic shock and oscillation of an optical system.

In one aspect, an exemplary embodiment of the present disclosure may provide an apparatus. The apparatus has a plate adapted to hold at least one optical device. The apparatus also has at least one dampening assembly having a first end operably engaged with the plate and an opposing second end operably engaged with a platform. The at least one dampening assembly further comprises: a housing; a shaft having a first end operably engaged with the plate and an opposing second end disposed inside of a housing, wherein the shaft is operably engaged with the housing and is adapted to be moveable relative to the housing; a plunger operably engaged with the second end of the shaft, wherein the plunger is adapted to control movement of the shaft inside of the housing via the check valve assembly; at least one biaser operably engaged with the housing and the plunger, wherein the at least one biaser is adapted to return the shaft to a neutral position after a ballistic event; and a stabilizing assembly operably engaged with the housing and the shaft, wherein the stabilizing assembly is adapted to maintain the shaft at the neutral position during non-ballistic events.

This exemplary embodiment or another exemplary embodiment may further provide at least one mount operably engaged with the platform; wherein the second end of the at least one dampening assembly is operably engaged with the at least one mount; and wherein the plate and the at least one dampening assembly are independently moveable relative to the platform during the ballistic event. This exemplary embodiment or another exemplary embodiment may further provide that the at least one bracket is operably engaged with a bottom surface of said plate, wherein the first end of the at least one dampening assembly is operably engaged with the at least one bracket of the plate; and wherein the at least one dampening assembly is independently rotatable relative to the plate and the platform. This exemplary embodiment or another exemplary embodiment may further provide a check valve assembly adapted to reduce movement of the plate and the at least one optical device in response to a ballistic event generated by a ballistic device on or proximate the platform. This exemplary embodiment or another exemplary embodiment may further provide that the check valve assembly further comprises a first check valve operably engaged with a top surface of the plunger, wherein the first check valve is adapted to be moveable from a closed state to an opened state when the shaft is forced towards the plate; and an opposing second check valve operably engaged with a bottom surface of the plunger, wherein the second check valve is adapted to be moveable from a closed state to an opened state when the shaft is forced towards the platform. This exemplary embodiment or another exemplary embodiment may further provide that the at least one dampening assembly further comprises an opposing second biaser operably engaged with the housing and the plunger, wherein the second biaser is adapted to return the shaft to the neutral position after the ballistic event. This exemplary embodiment or another exemplary embodiment may further provide that the at least one biaser is disposed between a first end of the housing and a top surface of the plunger; and wherein the second biaser is disposed between an opposing second end of the housing and a bottom surface of the plunger. This exemplary embodiment or another exemplary embodiment may further provide that the stabilizing assembly further comprises a support arm operably engaged with an outer surface of the housing; and a ball detent mechanism operably engaged with the support arm, wherein the ball detent mechanism is adapted to operably engaged with a groove defined in the shaft to maintain the shaft at the neutral position during non-ballistic events. This exemplary embodiment or another exemplary embodiment may further provide that the housing further comprises an outer body having a first end and an opposing open second end, wherein the first end of the outer body is operably engaged with the shaft; and an inner body operably engaged with the outer body; wherein the inner body is adapted to be moveable through the open second end of the outer body and operably engaged with the platform. This exemplary embodiment or another exemplary embodiment may further provide that the housing further comprises a slot defined in the outer body between the first end and the open second end, wherein the slot is adapted to allow the stabilizing assembly be moveable inside of the slot; and an aperture defined in the inner body and aligned with the slot, wherein the aperture is adapted to allow the stabilizing assembly to be operably engaged with the inner body. This exemplary embodiment or another exemplary embodiment may further provide that the check valve assembly further comprises a first check valve operably engaged with a housing at a first inlet defined at a first end of the housing, wherein the first check valve is adapted to be moveable from a sealed state to an unsealed state; a second check valve operably engaged with the housing at a second inlet defined at a second end of the housing, wherein the second check valve is adapted to be moveable from a sealed state to an unsealed state; and a conveying member operably engaged with the first check valve and the second check valve, wherein the conveying member is adapted to transfer material between the first check valve and the second check valve based on the position of a plunger inside of the housing.

In another aspect, an exemplary embodiment of the present disclosure may provide a dampening assembly. The dampening assembly further comprises a housing; a shaft operably engaged with the housing, wherein the shaft is adapted to be moveable relative to the housing; a plunger operably engaged with the shaft, wherein the plunger is adapted to control movement of the shaft inside of the housing; at least one biaser operably engaged with the housing and the plunger, wherein the at least one biaser is adapted to return the shaft to a neutral position after the ballistic event; a check valve assembly disposed within the housing and adapted to control fluid movement within the housing in response to force from the biaser; and a stabilizing assembly operably engaged with the housing and the shaft, wherein the stabilizing assembly is adapted to maintain the shaft at the neutral position during non-ballistic events.

This exemplary embodiment or another exemplary embodiment may further provide that the check valve assembly further comprises a first check valve operably engaged with a top surface of the plunger, wherein the first check valve is adapted to be moveable from a closed state to an opened state when shaft is forced towards the plate; and an opposing second check valve operably engaged with a bottom surface of the plunger, wherein the second check valve is adapted to be moveable from a closed state to an opened state when shaft is forced towards the platform. This exemplary embodiment or another exemplary embodiment may further provide that the check valve assembly further comprises a first check valve operably engaged with the housing at a first inlet defined at a first end of the housing, wherein the first check valve is adapted to be moveable from a sealed state to an unsealed state; a second check valve operably engaged with the housing at a second inlet defined at a second end of the housing, wherein the second check valve is adapted to be moveable from a sealed state to an unsealed state; and a conveying member operably engaged with the first check valve and the second check valve, wherein the conveying member is adapted to transfer material between the first check valve and the second check valve based on the position of a plunger inside of the housing.

In another aspect, an exemplary embodiment of the present disclosure may provide a method. The method comprises the steps of: providing a plate and at least one dampening assembly, wherein the plate is operably engaged with the at least one dampening assembly; effecting the plate, the at least one dampening assembly, and an optical device to be mounted to a platform; effecting a first dampening force to be exerted on the optical device, via the at least one dampening assembly, in a first direction in response to a ballistic event; effecting an opposing second dampening force to be exerted on the optical device, via the at least one dampening assembly, in an opposing second direction; and effecting the optical device to be maintained at a neutral position subsequent to the ballistic event.

This exemplary embodiment or another exemplary embodiment may further provide the steps of exerting a ballistic force on a shaft of the at least one dampening assembly; transitioning a first check valve of a plunger of the at least one dampening assembly from a sealed position to an unsealed position via material disposed inside of a housing of the at least one dampening assembly; moving the shaft from a neutral position to a transitioned position; exerting a first biasing force on the plunger, via at least one biaser, inside of the housing; transitioning a second check valve of the plunger from a sealed position to an unsealed position via material disposed inside of the housing; and moving the shaft from the transitioned position to the neutral position. This exemplary embodiment or another exemplary embodiment may further provide the steps exerting a ballistic force on a shaft of the at least one dampening assembly; transitioning a first check valve of a plunger of the at least one dampening assembly from a sealed position to an unsealed position via material disposed inside of a housing of the at least one dampening assembly; moving the shaft from a neutral position to a transitioned position; exerting a first biasing force on the plunger, via a first biaser, inside of the housing for reducing travel of the shaft; transitioning a second check valve of the plunger from a sealed position to an unsealed position via material disposed inside of the housing; exerting a second biasing force on the plunger, via a second biaser, inside of the housing for readjusting position of shaft; and moving the shaft from the transitioned position to the neutral position. This exemplary embodiment or another exemplary embodiment may further provide that the step of maintaining the optical device at a neutral position further comprises a stabilizing assembly of the at least one dampening assembly maintaining a shaft of the at least one dampening assembly at the neutral position during non-ballistic events. This exemplary embodiment or another exemplary embodiment may further provide the steps of exerting a ballistic force on a shaft of the at least one dampening assembly; transitioning a first check valve of a housing of the at least one dampening assembly from a sealed position to an unsealed position via material disposed inside of the housing; moving the shaft from a neutral position to a transitioned position; exerting a first biasing force on the plunger, via a first biaser, inside of the housing for reducing travel of the shaft; transitioning a second check valve of the housing from a sealed position to an unsealed position via material disposed inside of the housing; exerting a second biasing force on the plunger, via a second biaser, inside of the housing for readjusting position of shaft; and moving the shaft from the transitioned position to the neutral position. This exemplary embodiment or another exemplary embodiment may further provide the steps exerting a third dampening force on the optical device, via a second dampening assembly, in a third direction; and exerting an opposing fourth dampening force on the optical device, via the second dampening assembly, in an opposing fourth direction.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 3 is a partial cross-sectional view of a plate and first and second dampening assemblies of the at least one apparatus shown in FIG. 2, wherein the shroud is removed.

Similar numbers refer to similar parts throughout the drawings.

DETAILED DESCRIPTION

Figure 1:
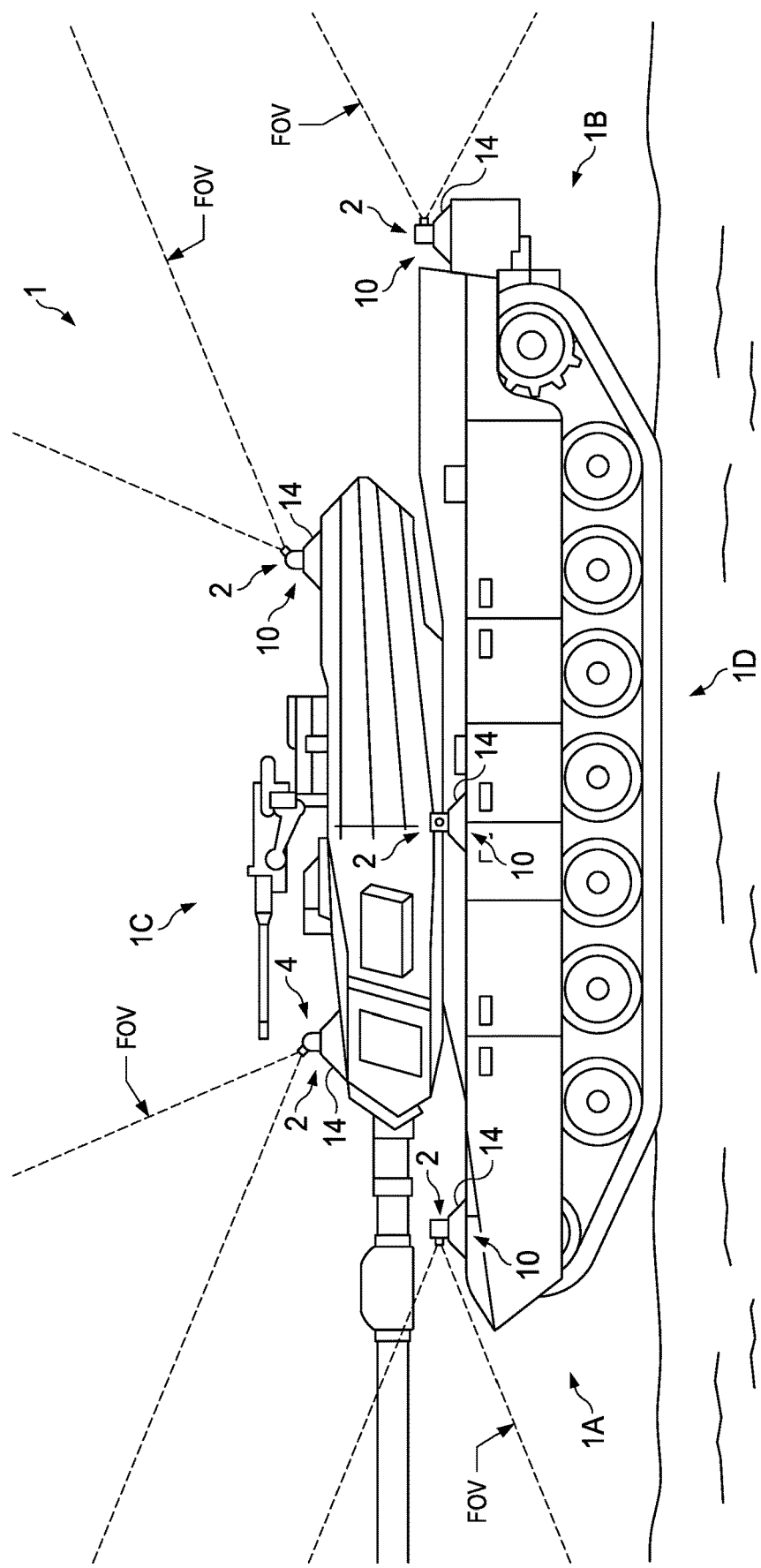
FIG. 1 is a diagrammatic view showing a platform having at least one optical instrument operably engaged with at least one apparatus in accordance with an aspect of the present disclosure.

FIG. 1 illustrates a military platform, a military ground vehicle, and/or an armored vehicle, which will generally be referred herein as a "platform" or a "ground vehicle." The platform is indicated generally by the reference number 1. It will be understood that the illustrated platform 1 is exemplary only and any type of platform, military platform, mobile platform, or stationary platform is contemplated to be represented by the illustrated platform. Other types of platforms or ground vehicles that are represented by platform 1 may include light utility vehicles, light armored utility vehicles, armored combat support vehicles, armored personnel carrier vehicles, infantry fighting vehicles, main battle tank vehicles, or any other suitable type of platforms. In the illustrated embodiment, platform 1 is an armored tank vehicle. Additionally, the platform 1 may be vessel or a marine vehicle adapted to be used on a body of water. In addition, the platform 1 may be a platform capable of moving or a platform that remains stationary.

Referring to FIG. 1, the platform 1 includes a front end 1A, an opposed rear end 1B, and a longitudinal direction that is directed from the rear end 1B to the front end 1A. The platform 1 also includes a top end 10, an opposed bottom end 1D, and a vertical direction that is directed from the bottom end 1D to the top end 10. It should be understood that the directions of "front," "rear," "top," "bottom," "right," "left," and other directional derivatives applied herein are only used as a directional reference for the platform 1, associated components and/or parts of the platform 1, and other devices, instruments, or assembly positioned with the platform 1 described and illustrated herein.

The platform 1 also includes at least one optical instrument 2 disposed with the platform 1 for situational awareness and viewing of the surrounding environment. The at least one optical instrument 2 may be used to provide assistance to the driver of the platform 1 when operating and using the platform 1 during a military operation. In essence, the at least one optical device 2 provides a field of view "FOV" to the driver of the platform 1 so that the driver may be able to maneuver and drive the platform 1 during a military operation. In other exemplary embodiments, at least one optical instruments may be used for other operations based on various considerations, including defensive military operations, offensive military operations, and other operations of the like. In the illustrated embodiment, platform 1 includes four optical instruments 2 to assist the driver in maneuvering and driving platform 1 during a military operation. In other exemplary embodiments, a suitable number of optical instruments may be provided on a platform based on various considerations described herein.

Figure 2:
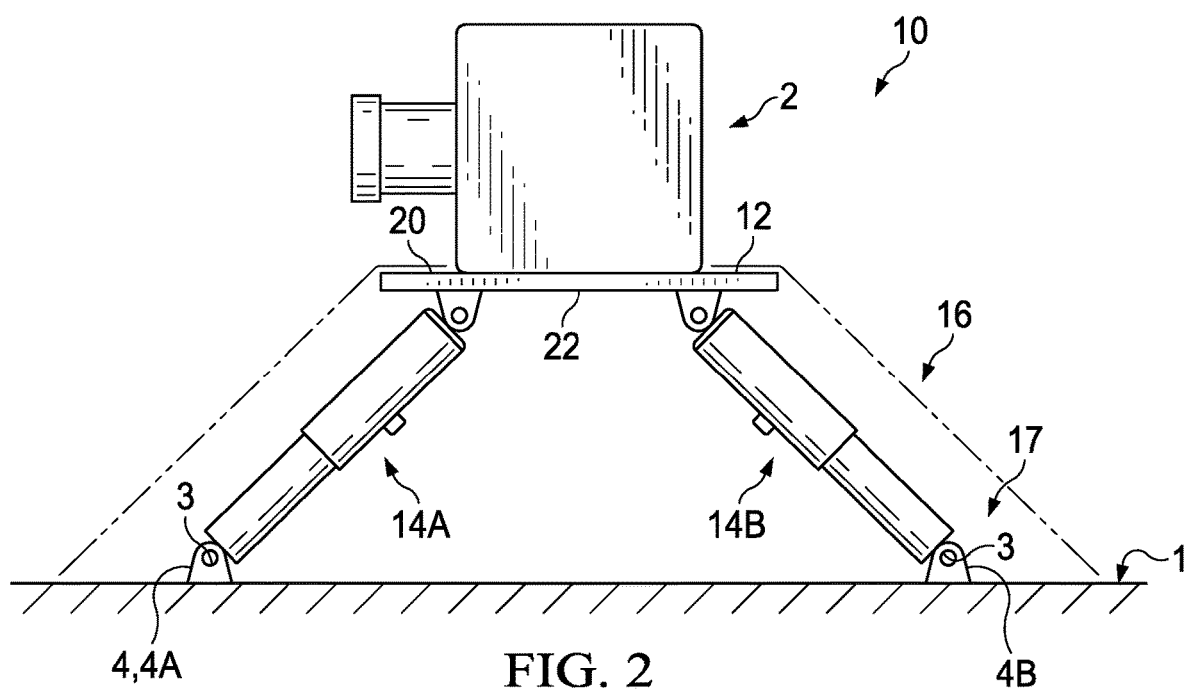
FIG. 2 is a side elevation view of the at least one optical instrument operably engaged with at the least one apparatus, wherein a shroud is operably engaged with the at least one apparatus and the platform.

Referring to FIGS. 1 and 2, the platform 1 may include at least one apparatus, which will be generally referred to as 10. The at least one apparatus 10 is operably engaged with the platform 1 via mounts 4 provided on the platform 1. The apparatus 10 may include a plate 12 that operably engages with the at least one optical instrument 2. The apparatus 10 may also include at least one dampening assembly 14 operably engaged with the plate 12 (described in more detail below) and the platform 1 via at least one platform mount 4 defining at least one through-hole 3. As described in more detail below, the at least one dampening assembly 14 is adapted to reduce the movement of the plate 12 and optical instrument 4 from a ballistic event created by a ballistic device on the platform 1. As used herein, a ballistic event on a platform includes direct collisions between ballistic projectiles as well as indirect collisions (ex. shockwaves) on or proximate the platform. In the illustrated embodiment, the apparatus 10 includes a first dampening assembly 14A and an opposing second dampening assembly 14B where each dampening assembly 14A, 14B is operably engaged with the plate 12 (described in more detail below) and the platform 1 via a first platform mount 4A and an opposing second platform mount 4B. In other exemplary embodiments, any suitable number of dampening assemblies may be operably engaged with a plate for dampening and absorbing a ballistic shock. Examples of a suitable number of dampening assemblies operably engaged with a plate for dampening and absorbing a ballistic shock include at least one dampening assembly, two dampening assemblies, a plurality of dampening assemblies, three dampening assemblies, four dampening assemblies, and other any suitable number of dampening assemblies may be operably engaged with a plate for dampening and absorbing a ballistic shock.

Still referring to FIGS. 1 and 2, a shroud 16 may be disposed about the apparatus 10 inside of a compartment 17 defined by the shroud 16. The shroud 16 may be used to protect certain parts of the apparatus 10 from the external environment and external material surrounding the platform 1. As such, the shroud 16 may be used to prevent the introduction of dust, dirt, and other contaminants or obstructions into the compartment 17 to allow the apparatus 10 to fully function by reducing the movement of the plate 12 and optical instrument 4 during a ballistic event on the platform 1. Moreover, the shroud 16 may be made a flexible and/or resilient material that will not interfere with the motion of the optical instrument 2, the plate 12, and the dampening assemblies 14A, 14B while still returning to its original shape upon the completion of ballistic events. In one exemplary embodiment, a shroud may be made from an elastomeric material in the shape of cone or similar shape.

While the at least one apparatus 10 may be provided on the platform 1 to dampen the movement of the at least one optical instruments 2, any suitable number of apparatus may be provided on a platform to dampen any suitable number of optical instruments. In the illustrated embodiment of FIG. 1, five apparatuses 10 are included on the platform 1 for dampening the movement of an associated optical instrument 2 during a ballistic event. In the illustrated embodiment, a single optical instrument 2 is operably engaged with a single apparatus 10 on the platform 1.

As illustrated in FIGS. 2-6B, the apparatus 10 includes a first dampening assembly 14A and an opposing second dampening assembly 14B to dampen and reduce the movement of the plate 12 and optical instrument 4 from a ballistic event created by a ballistic device on or near the platform 1. While the apparatus 10 may include the first and second dampening assemblies 14A, 14B, any suitable number of dampening assemblies may be provided with at least one apparatus on a platform 1. In one exemplary embodiment, an apparatus may include a first dampening assembly, a second dampening assembly, and a third dampening assembly to dampen and reduce the movement of the plate 12 and optical instrument 4 from a ballistic event created by a ballistic device on the platform 1. In another exemplary embodiment, a first dampening assembly, a second dampening assembly, a third dampening assembly, and a fourth dampening assembly to dampen and reduce the movement of the plate 12 and optical instrument 4 from a ballistic event created by a ballistic device on the platform 1.

As illustrated in FIG. 3, the plate 12 may include a front end 12A, an opposing rear end 12B, and a longitudinal axis defined therebetween. The plate 12 may also include a top surface 20 that is configured to operably engage with the at least one optical instrument 2. Any suitable mechanism may be used to operably engage the at least one optical instrument 2 with the plate 12. Examples of mechanisms that may be used to operably engage at least one optical instrument with a plate include adhering, attaching, affixing, connecting, fastening, locking, linking, press-fitting, securing, welding, and any other mechanism that may be used to operably engage at least one optical instrument with a plate.

Still referring to FIG. 3, the plate 12 may also include an opposing bottom surface 22. The plate 12 may have a front bracket 24A that is operably engaged with the plate 12 along the bottom surface 22 of the plate 12 proximate to the front end 12A of the plate 12. The plate 12 may have an opposing rear bracket 24B that is operably engaged with the plate 12 along the bottom surface 22 of the plate 12 proximate to the rear end 12B of the plate 12. Each of the front bracket 24A and the rear bracket 24B may define a through-hole 25. Each through-hole 25 of the front and rear brackets 24A, 24B may extend through the respective bracket 24A, 24B orthogonal to the longitudinal axis of the plate 12. Such uses of the front and rear brackets 24A, 24B are described in more detail below. In other exemplary embodiments, front and rear brackets of a plate may have additional support structures for implementing multi-degree joints such as ball and socket joints or heim joints.

As discussed above, the apparatus 10 may include the first dampening assembly 14A and the opposing second dampening assembly 14B. The first and second dampening assemblies 14A, 14B are configured to provide a dampening and/or reduction mechanism to the plate 12 and the optical instrument 2 during a ballistic event, which is described in more detail below. The first and second dampening assemblies 14A, 14B are substantially similar to one another and are engaged with plate 12 in a mirrored-image orientation. Inasmuch as the dampening assemblies 14A, 14B are substantially similar, the following description will relate to the first dampening assembly 14A. It should be understood, however, that the description of the first dampening assembly 14A applies equally to the second dampening assembly 14B.

Figure 3A:
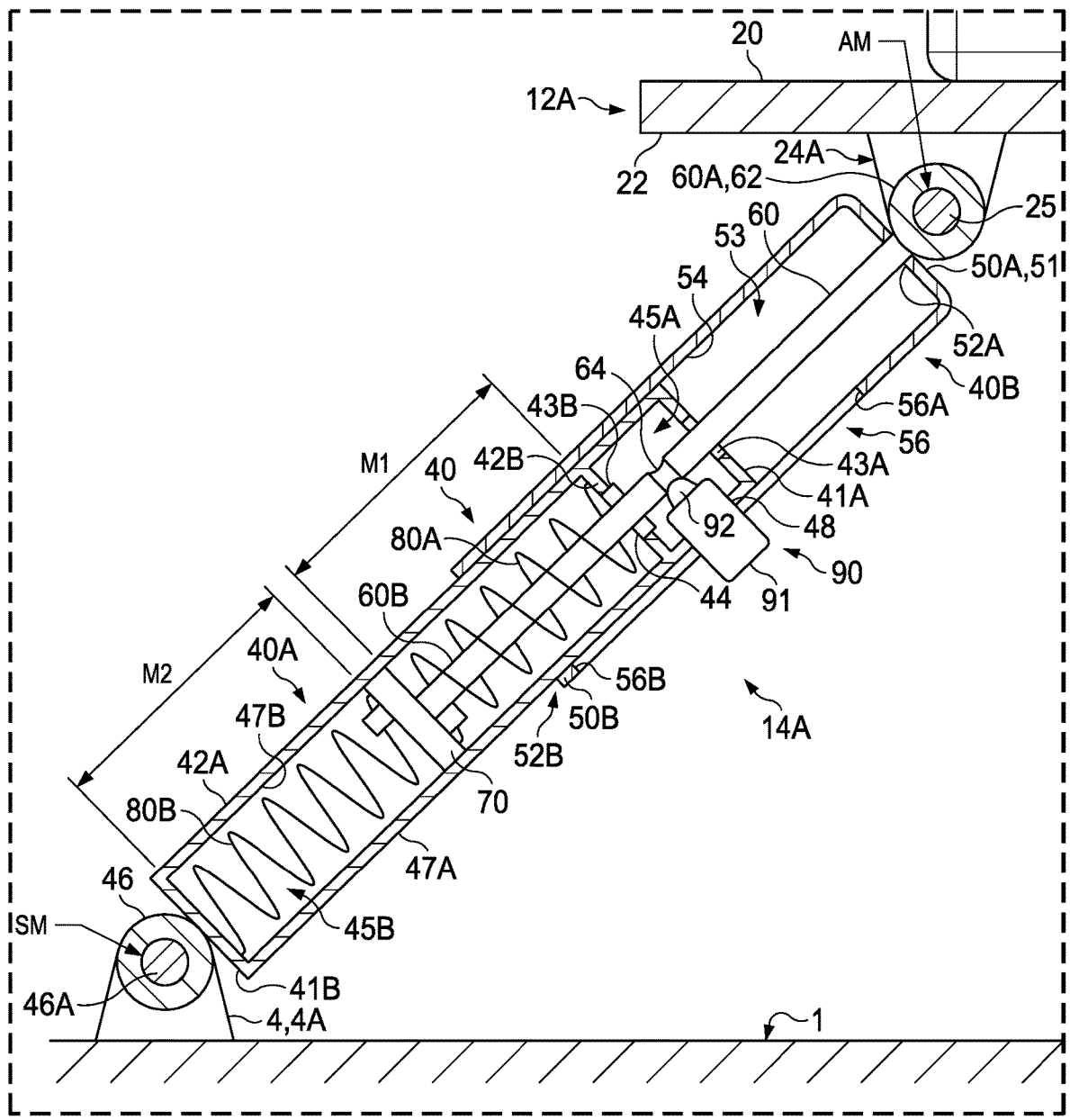
FIG. 3A is an enlargement of the highlighted region labeled in FIG. 3.

Still referring to FIG. 3, the first dampening assembly 14A may include a housing 40 that has an inner body 40A moveable disposed inside of an outer body 40B of the housing 40. As shown in FIG. 3A, the inner body 40A may have a top end 41A, an opposing bottom end 41B, and a longitudinal axis defined therebetween. The inner body 40A may also have a circumferential wall 42A that extends from the top end 41A to the bottom end 41 and disposed about the longitudinal axis of the inner body 40A. The inner body 40A may also have cross member 42B operably engaged with the circumferential wall 42A interior to the inner body 40A and extends orthogonally relative to the longitudinal axis of the inner body 40A. The circumferential wall 42A may define a top opening 43A at the top end 41A of the inner body 40A. The cross member 42B may define a medial opening 43B where a seal 44 is operably engaged with the cross member 42B inside of said medial opening 43B. The purpose and use of the seal 44 is described in more detail below.

Still referring to FIG. 3A, the inner body 40A defines an upper chamber 45A via the circumferential wall 42A and the cross member 42B where the upper chamber 45A is defined between the top end 41A of the inner body 40A and the cross member 42B. The inner body 40A also defines a lower chamber 45B via the circumferential wall 42A and the cross member 42B where the lower chamber 45B is defined between the bottom end 41B of the inner body 40A and the cross member 42B. In the illustrated embodiment, the upper chamber 45A and the lower chamber 45B are isolated from one another via the seal 44 disposed inside of the medial opening 43B defined by the cross member 42B. Such isolation between the upper chamber 45A and the lower chamber 45B is considered advantageous at least because fluid or material provided in the lower chamber 45B cannot escape from the lower chamber 45B to the upper chamber 45A during use of the apparatus 10.

As illustrated in FIGS. 3-6B, the first dampening assembly 14A and the second dampening assembly 14B may use a pneumatic mechanism such that a volume of air is loaded into the lower chamber 45B. While the first and second dampening assemblies 14A, 14B may use a pneumatic mechanism, first and second dampening assemblies may use any suitable mechanism for dampening ballistic shock. Examples of suitable mechanisms for first and second dampening assemblies includes hydraulic mechanisms, magnetic mechanisms, friction lock mechanisms, and other suitable mechanisms for first and second dampening assemblies for dampening ballistic shock.

Still referring to FIG. 3A, the inner body 40A may include a lower mount 46 that extends downwardly away from the bottom end 41B of the inner body 40A. The lower mount 46 may also define at least one through-hole 46A that extends entirely through the lower mount 46 orthogonal to the longitudinal axis of the inner body 40A. In addition, a securement mechanism "SM" may operably engage the inner body 40A to the first mount 4A of the platform 1; the second dampening assembly 14B is also operably secured to the second mount of the platform 1 via another securement mechanism "SM." In the illustrated embodiment, the securement mechanism "SM" of each of the dampening assemblies 14A, 14B is a retaining pin that passes through the first mount 4A of the platform and the lower mount 46 of the inner body 40A via the openings 5 and through-hole 46A. In this illustrated embodiment, the securement mechanism "SM" being a retaining pin or similar device allows the first dampening assembly 14A and the second dampening assembly 14B to freely rotate relative to the platform 1 during a ballistic event. This free rotation is considered advantageous at least because the rotation allows the apparatus 10 to absorb the ballistic shock created by a ballistic device and to protect the optical instrument 2 and its associated electrical components and assemblies. However, other exemplary securement mechanisms of the like may be provided for operably engaging at least one dampening assembly with a platform. In one instance, a securement mechanism may be a ball and socket joint or a heim joint.

Still referring to FIG. 3, the inner body 40A also defines an exterior surface 47A that extends along the circumferential wall 42A between the top end 41A and the bottom end 41B. The exterior surface 47A operably engages with the outer body 40B during dampening operations, which is described in more detail below. The inner body 40A also defines an opposing interior surface 47B that extends along the circumferential wall 42A between the top end 41A and the bottom end 41B inside of the lower chamber 45B. Such use of the interior surface 47B is described in more detail below. Additionally, the inner body 40A may define a side through-hole 48 between the top end 41A and the cross member 42B which extends entirely through the circumferential wall orthogonal to the longitudinal axis of the inner body 40A. Such use of the side through-hole 48 is also described in more detail below.

Still referring to FIG. 3, the outer body 40B also include a top end 50A, an opposing bottom end 50B, and a longitudinal axis defined therebetween. The outer body 40B may also include a surrounding wall 51 that extends from the top end 50A to the bottom end 50B. The surrounding wall 51 may also define a top aperture 52A that is defined at the top end 50A of the outer body 40B. The surrounding wall 51 may also define a bottom aperture 52B that is defined at the bottom end 50B of the outer body 40B where the bottom aperture 52B has a diameter greater than the top aperture 52A. The surrounding wall 51 may also define a cavity 53 that extends from the bottom end 50B to the top end 50A where the cavity 52 is accessible via the top aperture 52A or the bottom aperture 52B. The surrounding wall 51 may also define an internal surface 54 that extends from the bottom end 50B to the top end 50A. The internal surface 54 of the surrounding wall 51 operably engages with the exterior surface 47A of the circumferential wall 42A such that the inner body 40A is able to slidably move or translate axially inside of the outer body 40B during a dampening operation.

Still referring to FIG. 3, the surrounding wall 51 may also define a slot 56 that extends along the surrounding wall 51 parallel to the longitudinal axis of the outer body 40B. The slot 56 provides fluid communication between the cavity 53 and the external environment surrounding the first dampening assembly 14A. The slot 56 may have a top end 56A disposed proximate to the top end 50A of the outer body 40B and an opposing bottom end 56B disposed proximate to the bottom end 50B of the outer body 40B. Such use and purpose of the slot 56 is described in more detail below.

Still referring to FIG. 3, the first dampening assembly 14A may include a shaft 60 that extends into both the inner body 40A and the outer body 40B of the housing 40 where the shaft 60 is operably engaged with the housing 40 and adapted to be movable relative to the housing 40. The shaft 60 may have a top end 60A, an opposing bottom end 60B, and a longitudinal axis defined therebetween. The shaft 60 may include top mount 62 that is operably engaged with the front bracket 24A of the plate 12 via an attachment mechanism "AM"; a shaft 60 of the second dampening assembly 14B may be operably engaged with the rear bracket 24B of the plate 12 via an attachment mechanism "AM." In the illustrated embodiment, the attachment mechanism "AM" of each of the dampening assemblies 14A, 14B is a retaining pin that passes through the front bracket 24A of the platform and the top mount 62 of the shaft 60 via through-holes 25 of the front bracket 24A and through-hole (not illustrated) of the top mount 62. In this illustrated embodiment, the attachment mechanism "AM" being a retaining pin or a similar device allows the first dampening assembly 14A and the second dampening assembly 14B to freely rotate relative to the plate 12 during a ballistic event. This free rotation is considered advantageous at least because the rotation allows the apparatus 10 to absorb a ballistic shock created by a ballistic device and to protect the optical instrument 2 and its associated electrical components and assemblies. However, other exemplary attachment mechanisms may be provided for operably engaging at least one dampening assembly with a plate.

Still referring to FIG. 3, the shaft 60 may define a circumferential groove 64 positioned between the top end 60A and the bottom end 60B. The circumferential groove 64 extends into the shaft 60 in which the diameter of the circumferential groove 64 is less than the diameter of the shaft 60. The use and purpose of this circumferential groove 64 is described in more detail below.

Figure 4:
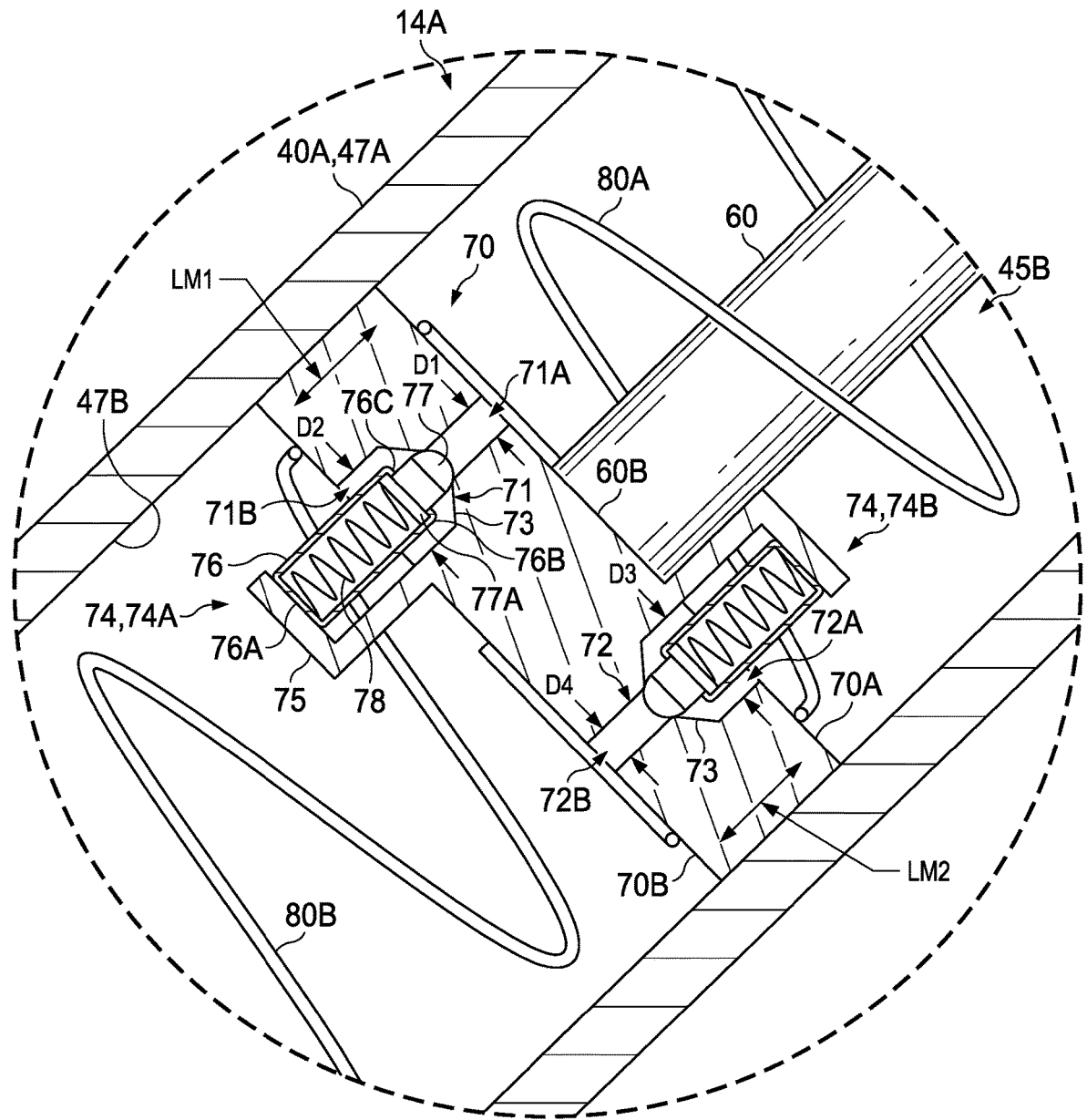
FIG. 4 is an enlargement of the highlighted region labeled in FIG. 3.

Referring to FIG. 4, the first dampening assembly 14A may include a plunger 70 operably engaged with the bottom end 60B of the shaft 60 where the plunger 70 is adapted to control the movement of the shaft 60 inside of the housing 40, specifically inside of the lower chamber 45B of the inner body 40A of the housing 40. The plunger 70 may include a top surface 70A that is operably engaged with the bottom end 60B of the shaft 60, an opposing bottom surface 70B, and a vertical axis defined therebetween.

Still referring to FIG. 4, the plunger 70 may define a first passageway 71 and an opposing second parallel passageway 72 relative to the vertical axis of the plunger 70. The first passageway 71 extends from a top opening 71A defined at the top surface 70A of the plunger 70 to a bottom opening 71B defined at the bottom surface 70B of the plunger 70. In the illustrated embodiment, the first passageway 71 defines a first diameter "D1" that extends from the top opening 71A to a shoulder 73 defined inside of the first passageway 71 between the top and bottom surfaces 70A, 70B of the plunger 70. The first passageway 71 also defines a second diameter "D2" that extends from the bottom opening 71B to the shoulder 73 defined inside of the first passageway 71 where the second diameter "D2" is greater than the first diameter "D1" as shown in FIG. 4.

Similarly, second passageway 72 extends from an upper opening 72A defined at the top surface 70A of the plunger 70 to a lower opening 72B defined at the bottom surface 70B of the plunger 70. In the illustrated embodiment, the second passageway 72 defines a third diameter "D3" that extends from the upper opening 72A to a shoulder 73 defined inside of the second passageway 72 between the top and bottom surfaces 70A, 70B of the plunger 70. The second passageway 72 also defines a fourth diameter "D4" that extends from the lower opening 72B to the shoulder 73 defined inside of the second passageway 72 where the fourth diameter "D4" is less than the third diameter "D3" as shown in FIG. 4. Such uses of the first and second passageways 71, 72 are described in more detail below.

Still referring to FIG. 4, the diameter of the plunger 70 is substantially equal to the inner diameter of the inner body 40A to prevent the leakage or escapement of fluid or material around the plunger 70 during a dampening operation. In other words, the circumferential edge of the plunger 70 acts as a seal when operably engaging with the interior surface 47B of the inner body 40A to only allow the fluid or material to pass through either the first passageway 71 or the second passageway 72. Such passage of fluid or material through one of the first passageway 71 or the second passageway 72 during a dampening operation is described in more detail below.

Still referring to FIG. 4, the plunger 70 may include a check valve assembly 74. The check valve assembly 74 of the plunger 70 may include a first check valve 74A operably engaged with the plunger 70 proximate to the bottom surface 70B and the first passageway 71. The check valve assembly 74 of the plunger 70 may also include an opposing second check valve 74B operably engaged with the plunger 70 proximate to the top surface 70A and the second passageway 72. The first and second check valves 74A, 74B are configured to allow fluid or material to pass through one of the first and second passageways 71, 72 of the plunger 70 to dampen and reduce the ballistic shock created during a ballistic event, which is described in more detail below. The first and second check valves 74A, 74B are substantially similar to one another and are engaged with the plunger 70 in a mirrored-image orientation. Inasmuch as the check valves 74A, 74B are substantially similar, the following description will relate to the first check valve 74A. It should be understood, however, that the description of the first check valve 74A applies equally to the second check valve 74B.

Figure 6A:
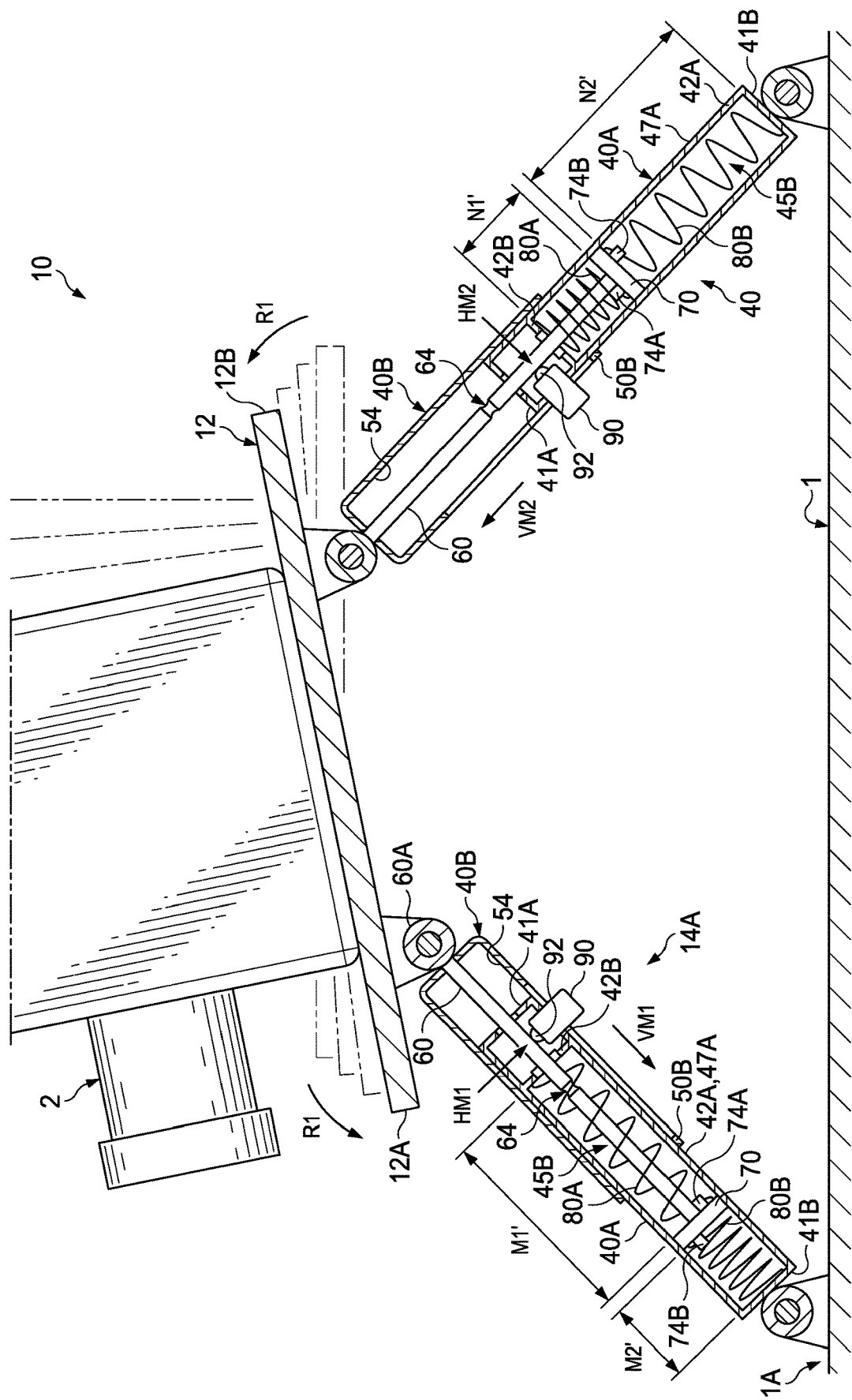
FIG. 6A is an operational view of the at least one optical instrument and the at least one apparatus transitioning from a neutral position to a translated position due to the ballistic force created by the ballistic device on the platform, wherein the at least one apparatus is dampening the ballistic force on the at least one optical instrument

As illustrated in FIG. 4, the first check valve 74A may include a support arm 75 that extends downwardly from the bottom surface 70B of the plunger 70. The first check valve 74A may also include a casing 76 that is operably engaged with the support arm 75. As illustrated in FIG. 4, the casing 76 is aligned with the first passageway 71 and is partially disposed inside of the first passageway 71 through the bottom opening 71B. The casing 76 may include a first end 76A that is operably engaged with the support arm 75. The casing 76 may also include an opposing second end 76B disposed inside of the first passageway 71 and defining a lip 76C extends laterally into the casing 76 defining a reduced opening. Still referring to FIG. 4, the first check valve 74A includes a moveable ball 77 that includes a collar 77A. The collar 77A defines a larger diameter than the lip 76C of the casing 76, which is adapted to limit the movement of the ball 77 inside of the casing 76. The first check valve 74A may also include a biaser 78 that is operably engaged with the first end 76A inside of said casing 76 and operably engaged with the ball 77. Such engagement between the ball 77 and the biaser 78 provides a biasing mechanism to the ball 77 where the ball 77 is adapted to be moveable from a sealed position (see FIGS. 4 and 6B) to an unsealed position (FIG. 6A). The ball 77 may be moveable between positions when fluid and/or material pressure is exerted into the first passageway 71 at the top opening 71A during a ballistic event. Such linear movement of the ball 77 for the first check valve 74A is denoted by a double arrow labeled "LM1" in FIG. 4. Such linear movement of the ball 77 for the second check valve 74B is denoted by a double arrow labeled "LM2" in FIG. 4. Such uses of the first and second check valves 74A, 74B during a ballistic event are described in more detail below.

While the first and second check valves 74A, 74B utilize spring-loaded mechanisms for sealing and unsealing positions, any suitable mechanism may be used to seal and unseal first and second check valves of a dampening assembly based on various considerations, including the size, shape, and configuration of the check valves, the amount of dampening and reduction of movement needed during a ballistic event, and other suitable considerations. Examples of suitable mechanisms used for sealing and unsealing first and second check valve of a dampening assembly include hydraulic mechanisms, friction mechanisms, magnetic mechanisms, electrical mechanisms, and any other suitable mechanisms used for sealing and unsealing first and second check valve of a dampening assembly during a ballistic event.

While the first and second check valves 74A, 74B are spring-loaded ball check valves, any suitable check valve may be used for a dampening assembly based on various considerations, including the size, shape, and configuration of the check valves, the amount of dampening and reduction of movement needed during a ballistic event, and other suitable considerations. Examples of suitable check valves used for a dampening assembly include diaphragm check valves, duckbill check valves, flapper check valves, in-line check valves, lift-check valves, pneumatic check valves, reed valves, swing check valves, and other suitable check valves for a dampening assembly.

While the first and second check valves 74A, 74B utilize a compression spring to bias the ball 77 between a sealed position and an unsealed position, any suitable spring or biaser may be used to bias a ball between a sealed position and an unsealed position for a check valve based on various considerations, including the size, shape, and configuration of the check valves, the amount of dampening and reduction of movement needed during a ballistic event, and other suitable considerations. Examples of suitable springs or biasers that may be used to bias a ball between a sealed position and an unsealed position for a check valve include tension or extension springs, torsion springs, constant springs, variable springs, flat springs, machined springs, serpentine springs, coiled or helical springs, volute springs, V-springs, and any other suitable springs or biasers that may be used to bias a ball between a sealed position and an unsealed position for a check valve.

While not illustrated herein, the plunger 70 may include a peripheral seal that extends along the outermost edge of the plunger 70. During operation, the peripheral seal may prevent the escapement of liquid or gas along the outermost edge of the plunger 70 when the plunger 70 is transitioning inside of the interior housing 40A.

Figure 6B:
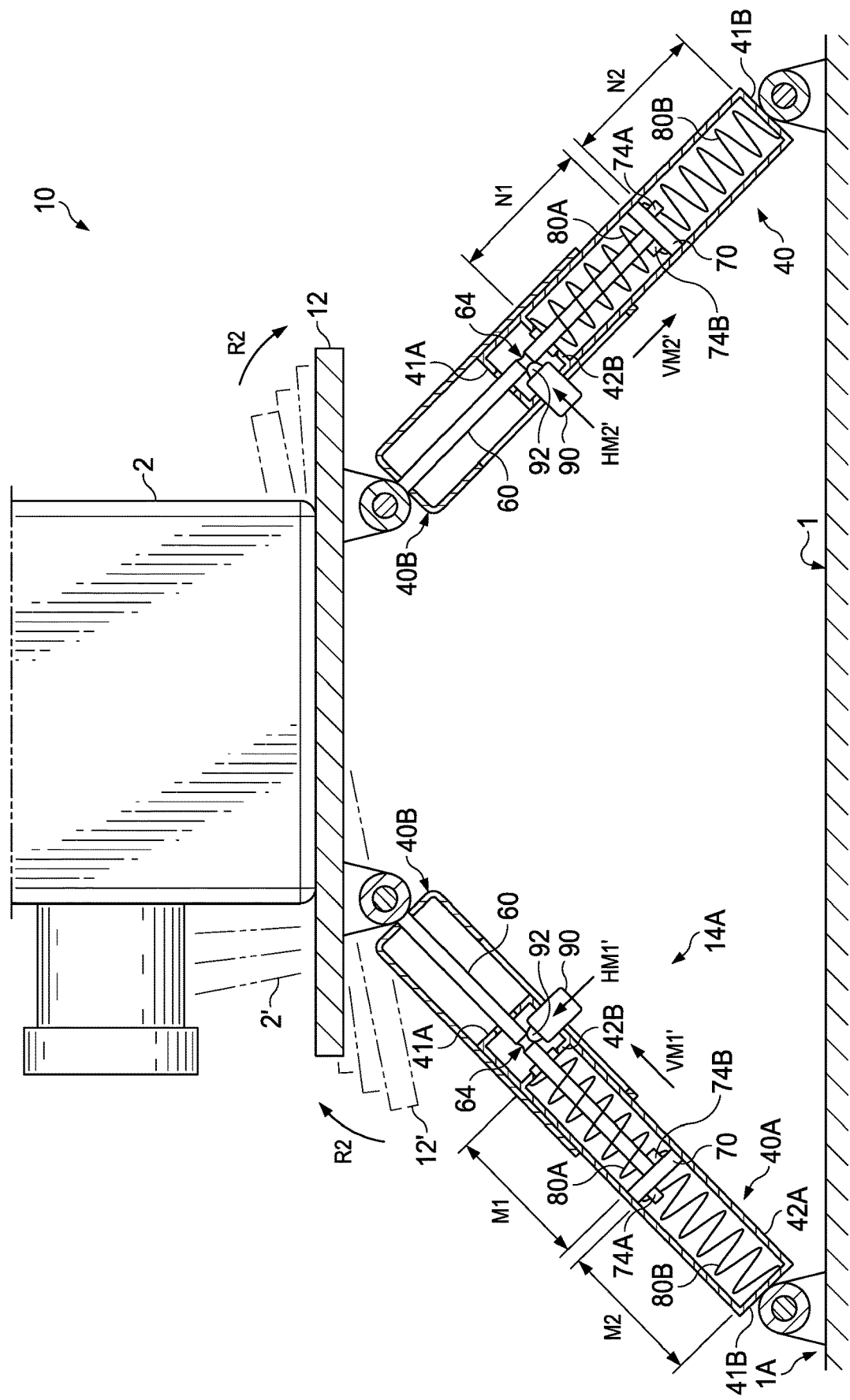
FIG. 6B is an operational view similar to FIG. 6A, but the at least one optical instrument and the at least one apparatus are transitioning from the translated position back to the neutral position via the at least one apparatus applying a dampening force greater than the dissipated ballistic force.

Referring to FIGS. 3 and 6A-6B, the first dampening assembly 14A may include at least one biaser 80 that is operably engaged with the housing 40 and the shaft 60 where the at least one biaser 80 is adapted to return the shaft 60 to a neutral position (see FIGS. 3-3B and 6B) after a ballistic event. In the illustrated embodiment, the first dampening assembly 14A may include an upper biaser 80A that is operably engaged with cross member 42B of the inner body 40A and operably engaged with the top surface 70A of the plunger 70. In addition, the first dampening assembly 14A may include an opposing lower biaser 80B that is operably engaged with the bottom end 41B of the inner body 40A and operably engaged with the bottom surface 70B of the plunger 70. Each of the upper biaser 80A and the lower biaser 80B is a compression-type spring that exerts outwardly directed forces (see FIGS. 6A-6B) to position the shaft 60 and the plunger 70 at the neutral position after receiving a ballistic force. Such uses of the biasers 80A, 80B during a ballistic event are described in more detail below.

While the upper biaser 80A and the lower biaser 80B are compression springs to bias the shaft 60 and the plunger 70 from a translated position (see FIG. 6A) to a neutral position (FIGS. 3-3B and 6B), any suitable springs or biasers for upper and lower biasers may be used for biasing a shaft and a plunger from a translated position to a neutral position based on various considerations, including the size, shape, and configuration of the biasers, the amount of dampening and reduction of movement needed during a ballistic event, and other suitable considerations. Examples of suitable biasers to bias a shaft and a plunger from a translated position to a neutral position include tension or extension springs, torsion springs, constant springs, variable springs, flat springs, machined springs, serpentine springs, coiled or helical springs, volute springs, V-springs, and any other suitable springs or biasers to bias a shaft and a plunger from a translated position to a neutral position.

As illustrated in FIG. 3, the first dampening assembly 14A may include at least one stabilizing assembly 90 that is operably engaged with the housing 40 and the shaft 60 where the at least one stabilizing assembly 90 is adapted to maintain the shaft 60 at the neutral position during normal, non-ballistic events. In other words, the at least one stabilizing assembly 90 maintains and stabilizes the shaft 60 during dynamic or vibration movements (e.g., driving the platform 1) to eliminate delayed motion sway to the driver of the platform when viewing through the optimal instrument 2. In the illustrated embodiment, the first dampening assembly 14A includes a single stabilizing assembly 90. In other exemplary embodiments, any suitable number of stabilizing assemblies may be provided in a first dampening assembly based on various considerations, including the number of circumferential grooves defined in a shaft, the amount of dampening and reduction of movement needed during non-ballistic events, and other considerations of the like.

As illustrated in FIG. 3, the stabilizing assembly 90 includes a casing 91 that is operably engaged with the inner body 40A inside of the through-hole 48 and operably engaged with the outer body 40B inside of the slot 56. In addition, the stabilizing assembly includes a spring-loaded ball detent 92 operably engaged with the casing 91 where the ball detent 92 is adapted to be moveable relative to the casing 91 (see FIGS. 6A and 6B). The ball detent 92 is also operably engaged with the shaft 60 inside of the circumferential groove 64 by creating a stabilizing mechanism between the stabilizing assembly 90 and the shaft 60. In addition, the spring-loaded ball detent 92 may use a compression-type spring.

During non-ballistic events, the ball detent 92 maintains the shaft 60 at the neutral position due to the ball detent 92 remaining operably engaged with the shaft 60 inside of the circumferential groove 64 (see FIGS. 3 and 6B). During ballistic events, however, the ballistic force created by a ballistic device on the platform 1 may overcome the spring tension of the spring-loaded ball detent 92 causing the shaft 60 to move from the neutral position to a translated position (see FIG. 6A). As such, the shaft 60 may cause the spring-loaded ball detent 92 to transition away from the shaft 60 and into the casing 91 due to the circumferential groove 64 moving upwardly or downwardly away from the ball detent 92. Once the ballistic force has dissipated and the spring tension is greater than said ballistic force, the spring-loaded ball detent 92 may operably engage with the shaft 60 inside of the circumferential groove 64 once the shaft 60 is returned to the neutral position (explained below) and the force of the spring-loaded ball detent 92 is greater than the force of the dissipated ballistic force.

While the stabilizing assembly 90 utilizes a spring-loaded mechanism for the ball detent 92, any suitable mechanism may be used for a ball detent of a stabilizing assembly based on various considerations, including the size, shape, and configuration of the ball detent, the amount of stabilization and reduction of movement needed during a non-ballistic events, and other suitable considerations. Examples of suitable mechanisms used for a ball detent of a stabilizing assembly include hydraulic mechanisms, friction mechanisms, magnetic mechanisms, electrical mechanisms, and any other suitable mechanisms suitable mechanisms used for a ball detent of a stabilizing assembly.

While the spring-loaded ball detent 92 uses a compression spring to maintain the shaft 60 at the neutral position during non-ballistic events, any suitable spring or biaser for a ball detent may be used to maintain a shaft at a neutral position during non-ballistic events based on various considerations, including the size, shape, and configuration of the biaser, the amount of stabilization and reduction of movement needed during a non-ballistic events, and other suitable considerations. Examples of suitable springs or biasers for a ball detent used to maintain a shaft at a neutral position during non-ballistic events include tension or extension springs, torsion springs, constant springs, variable springs, flat springs, machined springs, serpentine springs, coiled or helical springs, volute springs, V-springs, and any other suitable springs or biasers for a ball detent used to maintain a shaft at a neutral position during non-ballistic events.

Having now described the components and assemblies of the apparatus 10, the method of use and/or operation of the apparatus 10 is described below.

Prior to a ballistic event, the ball detent 92 of the stabilizing assembly 90 is operably engaged with the shaft 60 inside of the circumferential groove 64 (see FIG. 6A). As described above, the stabilizing mechanism created between the ball detent 92 and the shaft 60 inside of the circumferential groove 64 allows the optical instrument 2 to be stabilized and maintained at a neutral position to prevent against swaying or oscillation. Such swaying or oscillation of at least one optical instrument 2 may result in motion sickness when the driver of the platform 1 is viewing through the at least one optical instrument 2 during non-ballistic events. In addition, a first length "M1" of the top biaser 80A and the second length "M2" of the bottom biaser 80B for the first dampening assembly 14A are equal to one another in the neutral position (see FIGS. 3 and 6B). Similarly, a first length "N1" of the top biaser 80A and the second length "N2" of the bottom biaser 80B for the second dampening assembly 14B are equal to one another in the neutral position (see FIGS. 3 and 6B).

Figure 5:
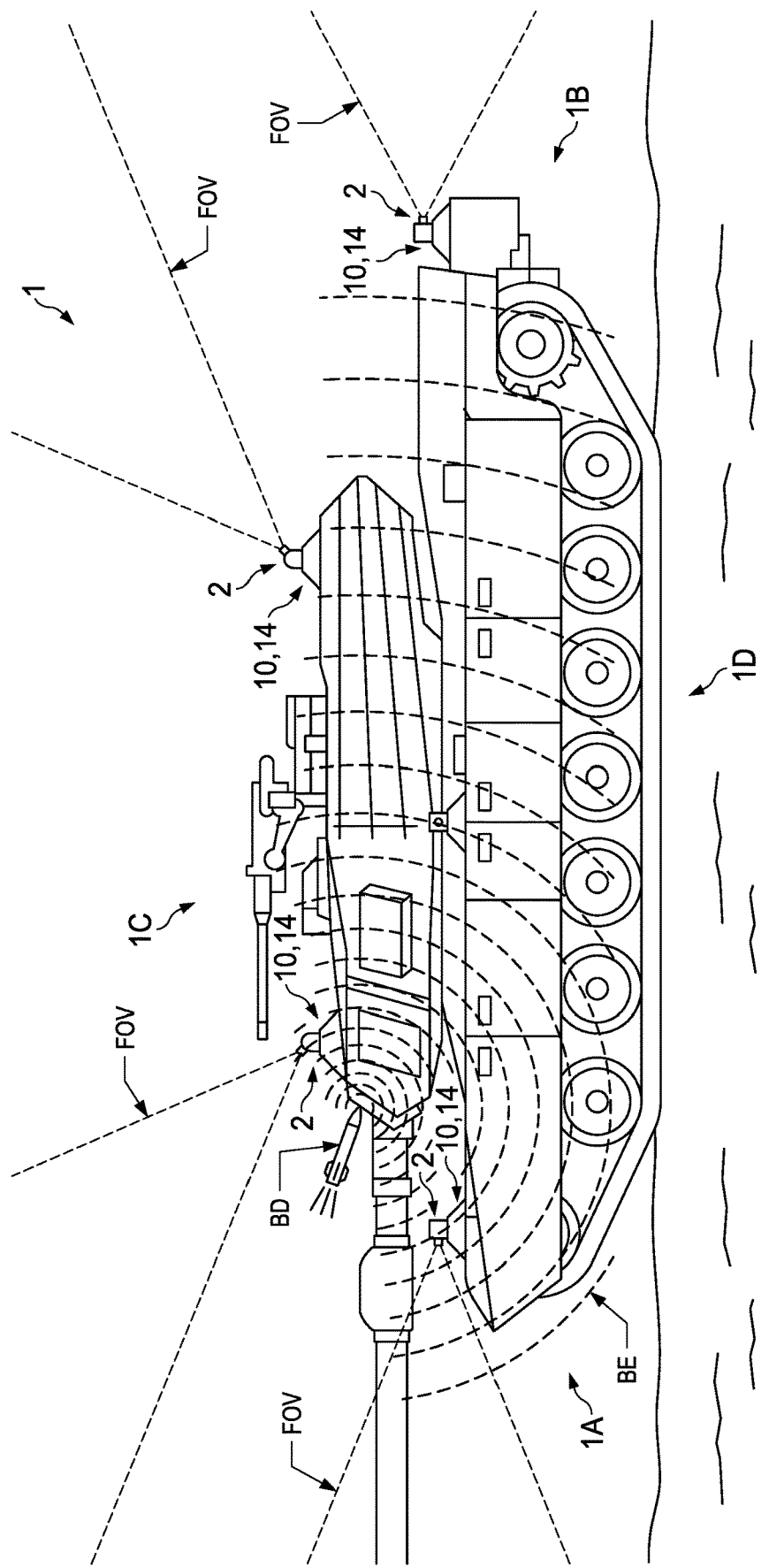
FIG. 5 is an operational view of a ballistic device impacting and detonating at a rear end of the platform, wherein the ballistic device creates a ballistic force on the platform upon detonation.

As illustrated in FIG. 5, a ballistic event occurs upon the platform 1 via a ballistic device "BD" impacting the platform 1 from the front end 1A. As such, the ballistic device "BD" may detonate on or proximate to the platform 1 generating a ballistic event or force/shock "BF" (i.e., generating an external force on or proximate the platform 1). During this event, each apparatus 10 provided on the platform 1 is adapted to absorb and dampen the ballistic force "BF" from the optical instrument 2 via the dampening mechanism created between the plate 12 and the first and second dampening assemblies 14A, 14B. In other instances, the ballistic device "BD" may detonate and generate a ballistic force or shock "BF" proximate to or near the platform 1. In other words, the ballistic device "BD" may detonate and generate a ballistic force or shock "BF" at a distance away from the platform 1 while still affecting the platform 1. Such absorption and dampening of the ballistic force "BF" is considered advantageous at least because the reduction in force exerted on the optical instrument 2 may reduce the likelihood of damage and impairment of any electrical components, mechanical components, or other viable components provided in the optical instrument 2 that allows the optical instrument 2 to operate.

Upon receiving the external force from the ballistic device "BE", an apparatus 10 that is positioned proximate to the front end 10A of the platform 1 transitions from a neutral position (FIG. 3) to a translated position (FIG. 6A). In the translated position, the optical instrument 2 along with the plate 12 rotate towards the front end 1A of the platform 1 upon receiving the ballistic force "BF" from the ballistic device "BD", which is shown in FIG. 5. As illustrated in FIG. 6A, the front end 12A of the plate 12 rotates towards the platform 1 and the first dampening assembly 14A while the rear end 12B of the plate 12 rotates away from the second dampening assembly 14B due to the ballistic force "BF" being directed from the front end 1A of the platform 1 towards the rear end 1B of the platform 1. The rotation of the plate 12 along with the optical instrument 2 from the neutral position to the translated position is denoted by arrows labeled "R1" in FIG. 6A.

Still referring to FIG. 6A, the first dampening assembly 14A and the second dampening assembly 14B are configured to dampen and absorb the rotation and movement of the plate 12 and the optical instrument 2. As for the first dampening assembly 14A, the optical instrument 2 and the plate 12 apply a pressing force onto the top end 60A of the shaft 60 causing the shaft 60 and the plunger 70 to transition downwardly towards the bottom end 41B of the inner body 40A. This vertical pressing force on the shaft 60 and the plunger 70 is denoted by an arrow labeled "VM1" shown in FIG. 6A. This pressing force exerted by the optical instrument and the plate 12 also transitions the outer body 40B along the inner body 40A where the outer body 40B is adapted to slidably move along the exterior surface 47A of the inner body 40A towards the bottom end 41B of the inner body 40A.

Still referring to FIG. 6A, the pressing force exerted by the optical instrument 2 and the plate 12 also transitions the second check valve 74B of the first dampening assembly 14A from the sealed position (see FIG. 4) to the unsealed position where the ball 77 disengages the shoulder 73. The unsealing of the second check valve 74B causes the material inside of the inner body to enter the second passageway 72 through the lower opening 72B and exit the second passageway 72 through the upper opening 72A. As such, the material (i.e., air) loaded into the lower chamber 45B of the inner body 40A exerts a greater amount of force on the ball 77 than the biaser 78 causing the ball 77 to move away from the second passageway 72 and allowing material to escape through the plunger 70. Additionally, no material is able to escape around the plunger 70 due to the outer diameter of the plunger 70 being substantially equal to the inner diameter of the inner body 40A. Such transitioning of the second check valve 74B allows the shaft 60 and the plunger 70 to move through the inner body 40A at a regulated speed based on the diameters of the second passageway 72, the compression strength of the biaser 78 operably engaged with the ball 77, and the type of material or fluid loaded into the inner body 40A. Moreover, the first check valve 74A remains in the sealed position and directly abuts the shoulder 73 inside of the first passageway 71 due to the material exerting a force in the same direction of the compression force exerted by the biaser 78 on the ball 77.

As the shaft 60 and the plunger 70 move towards the bottom end 41B of the inner body 40A, the lower biaser 80B compresses from the neutral length "M2" (see FIGS. 3 and 6B) to a translated length "M2'" that is less than the neutral length "M2." In addition, the upper biaser 80A expands from the neutral length "M1" (see FIGS. 3 and 6B) to a translated length "M1'" that is greater than the neutral length "M1." In this position, the lower biaser 80B is dampening and absorbing the pressing force exerted by the shaft 60 and the plunger 70 along with the pressing force exerted by the optical instrument 2 and the plate 12 to reduce the rotation and movement of the optical instrument 2. The dampening and reduction of rotation and movement of the optical instrument 2 can be varied based on various structural configurations, including the compression strength of the lower biaser 80B, the length of the lower biaser 80B, and the positioning of the lower biaser 80B.

As the shaft 60 and plunger 70 move towards the bottom end 41B of the inner body 40A, the ball detent 92 of the stabilizing assembly 90 disengages from the shaft 60 inside of the circumferential groove 64. Such disengagement between the shaft 60 and the stabilizing assembly is caused by the pressing force exerted by the plate 12 and the optical instrument 2 being greater than the compression strength exerted on the ball detent 92. As such, the ball detent 92 moves inwardly into the casing 91 and away from the shaft 60 causing the shaft 60 to freely move inside of the housing 40 to dampen the ballistic force "BF." The inward horizontal movement of the ball detent 92 is denoted by an arrow labeled "HM1" in FIG. 6A.

On the opposing side, the optical instrument 2 and the plate 12 exert a pulling force on the second dampening assembly 14B (see FIG. 6A). This opposing vertical pulling force on the shaft 60 and the plunger 70 of the second dampening assembly 14B is denoted by an arrow labeled "VM2" shown in FIG. 6A. This pulling force exerted by the optical instrument 2 and the plate 12 also transitions the outer body 40B along the inner body 40A where the outer body 40B is adapted to slidably move along the exterior surface 47A of the inner body 40A away from the inner body 40A.

Still referring to FIG. 6A, the pulling force exerted by the optical instrument 2 and the plate 12 also transitions the first check valve 74A of the second dampening assembly 14B from the sealed position (see FIG. 4) to the unsealed position. The unsealing of the first check valve 74A causes the material inside of the inner body 40A to enter the first passageway 71 through top opening 71A and exit the first passageway 71 through the bottom opening 71B. As such, the material (i.e., air) loaded into the lower chamber 45B of the inner body 40A exerts a greater amount of force on the ball 77 than the biaser 78 causing the ball 77 to move away from the shoulder 73 and the second passageway 72 and allowing material to escape through the plunger 70. Additionally, no material is able to escape around the plunger 70 due to the outer diameter of the plunger 70 being substantially equal to the inner diameter of the inner body 40A. Such transitioning of the first check valve 74A allows the shaft 60 and the plunger 70 to move through the inner body 40A and towards the top end 41A of the inner body 40A at a regulated speed based on the diameters of the first passageway 71, the compression strength of the biaser 78 operably engaged with the ball 77, and the type of material or fluid loaded into the inner body 40A. Moreover, the second check valve 74B remains in the sealed position and operably engaged with the shoulder 73 due to the material exerting a force in the same direction of the compression force exerted by the biaser 78 on the ball 77.

As the shaft 60 and the plunger 70 move towards the top end 41A of the inner body 40A, the upper biaser 80A compresses from the neutral length "N1" (see FIGS. 3 and 6B) to a translated length "N1'" that is less than the neutral length "N1." In addition, the lower biaser 80B expands from the neutral length "N2" (see FIGS. 3 and 6B) to a translated length "N2'" that is greater than the neutral length "N2." In this position, the upper biaser 80A of the second dampening assembly 14B is dampening and absorbing the pulling force exerted by the shaft 60 and the plunger 70 along with the pulling force exerted by the optical instrument 2 and the plate 12 to reduce the rotation and movement of the optical instrument 2. The dampening and reduction of rotation and movement of the optical instrument 2 can be varied based on various structural arrangements, including the compression strength of the upper biaser 80A, the length of the upper biaser 80A, and the positioning of the upper biaser 80A.

As the shaft 60 and plunger 70 move towards the top end 41A of the inner body 40A, the ball detent 92 of the stabilizing assembly 90 disengages from the shaft 60 inside of the circumferential groove 64. Such disengagement between the shaft 60 and the stabilizing assembly 90 is caused by the pulling force exerted by the plate 12 and the optical instrument 2 being greater than the compression strength exerted on the ball detent 92. As such, the ball detent 92 moves inwardly into the casing 91 and away from the shaft 60 causing the shaft 60 to freely move inside of the housing 40. The inward horizontal movement of the ball detent 92 is denoted by an arrow labeled "HM2" in FIG. 6A.

As illustrated in FIG. 6B, the apparatus 10 transitions from the translated position to the neutral position when the absorption mechanism exerted by the first dampening assembly 14A and the second dampening assembly 14B is greater than the dissipated ballistic force "BF" shown in FIG. 5.

As illustrated in FIGS. 4 and 6B, the lower biaser 80B applies an expansion force on the bottom surface 70B of the plunger 70 that is greater than the ballistic force "BF" when the ballistic force "BF" has dissipated enough that the compression strength is greater than the ballistic force "BF." As such, the lower biaser 80B transitions from the translated length "M2'" to the neutral length "M2" causing the plunger 70 and the shaft 60 to move towards the neutral position. The vertical transitioning of the lower biaser 80B causing the shaft 60 and plunger 70 to move upwardly is denoted by an arrow labeled "VM1'" shown in FIG. 6B. Additionally, the upper biaser 80A of the first dampening assembly 14A also applies an expansion force on the top surface 70A of the plunger 70 that is greater than the ballistic force "BF" when the ballistic force "BF" has dissipated enough that the compression strength is greater than the ballistic force "BF." Similar to the lower biaser 80B, the upper biaser 80A transitions from the translated length "M1" to the neutral length "M1" causing the plunger 70 and the shaft 60 to be maintained at the neutral position. As such, the upper and lower biasers 80A, 80B are configured to return the shaft 60 and the plunger 70 to the neutral position upon the happening of a ballistic event.

As the shaft 60 and plunger 70 are moving back towards the neutral position, the first and second check valves 74A, 74B transition to different positions based on the pressure being exerted by the material inside of the inner body 40A. During this transitioning period, the pushing force exerted by the lower biaser 80B transitions the first check valve 74A of the first dampening assembly 14A from the sealed position (see FIG. 4) to the unsealed position by disengaging the ball 77 from the shoulder 73. The unsealing of the first check valve 74A causes the material inside of the inner body 40A to enter the first passageway 71 through top opening 71A and exit the first passageway 71 through the bottom opening 71B. As such, the material (i.e., air) loaded into the lower chamber 45B of the inner body 40A exerts a greater amount of force on the ball 77 than the biaser 78 causing the ball 77 to move away from the first passageway 71 and allowing material to escape through the plunger 70. Additionally, no material is able to escape around the plunger 70 due to the outer diameter of the plunger 70 being substantially equal to the inner diameter of the inner body 40A. Such transitioning of the first check valve 74A allows the shaft 60 and the plunger 70 to move through the inner body 40A and towards the top end 41A of the inner body 40A at a regulated speed based on the diameters of the first passageway 71, the compression strength of the biaser 78 operably engaged with the ball 77, and the type of material or fluid loaded into the inner body 40A. Moreover, the second check valve 74B of the first dampening assembly 14A transitions from the unsealed position to the sealed position due to the material exerting a force in the same direction of the compression force exerted by the biaser 78 on the ball 77.

As the shaft 60 and plunger 70 move towards the top end 41A of the inner body 40A, the ball detent 92 of the stabilizing assembly 90 operably engages with the shaft 60 inside of the circumferential groove 64. Such engagement between the shaft 60 and the stabilizing assembly 90 is caused by the pressing force exerted by the plate 12 and the optical instrument 2 being less than the compression strength exerted on the ball detent 92 via the biaser of the stabilizing assembly 90. As such, the ball detent 92 moves outwardly from the casing 91 and into circumferential groove 64 of the shaft 60 causing the shaft 60 to freely move inside of the housing 40. The outward horizontal movement of the ball detent 92 is denoted by an arrow labeled "HM1'" in FIG. 6B.

On the opposing side, the upper biaser 80A of the second dampening assembly 14B applies an expansion force on the top surface 70A of the plunger 70 that is greater than the ballistic force "BF" when the ballistic force "BF" has dissipated enough that the compression strength is greater than the ballistic force "BF." As such, the upper biaser 80A transitions from the translated length "N1'" to the neutral length "N1" causing the plunger 70 and the shaft 60 to move towards the neutral position. The vertical transitioning of the upper biaser 80A causing the shaft 60 and plunger 70 to move downwardly is denoted by an arrow labeled "VM2'" shown in FIG. 6B. Additionally, the lower biaser 80B of the second dampening assembly 14B also applies an expansion force on the bottom surface 70B of the plunger 70 that is greater than the ballistic force "BF" when the ballistic force "BF" has dissipated enough that the compression strength is greater than the ballistic force "BF." Similar to the upper biaser 80A, the lower biaser 80B transitions from the translated length "N2'" to the neutral length "N2" causing the plunger 70 and the shaft 60 to be maintained at the neutral position. As such, the upper and lower biasers 80A, 80B are configured to return the shaft 60 and the plunger 70 to the neutral position upon the happening of a ballistic event.

As the shaft 60 and plunger 70 are moving back towards the neutral position, the first and second check valves 74A, 74B of the second dampening assembly 14B transition to different positions based on the pressure being exerted by the material inside of the inner body 40A. During this transitioning period, the pushing force exerted by the upper biaser 80B transitions the second check valve 74B of the second dampening assembly 14B from the sealed position (see FIG. 4) to the unsealed position by disengaged in the ball 77 from the shoulder 73. The unsealing of the second check valve 74B causes the material inside of the inner body 40A to enter the second passageway 72 through lower opening 72B and exit the second passageway 72 through the upper opening 72A. As such, the material (i.e., air) loaded into the lower chamber 45B of the inner body 40A exerts a greater amount of force on the ball 77 than the biaser 78 causing the ball 77 to move away from the second passageway 72 and allowing material to escape through the plunger 70. Additionally, no material is able to escape around the plunger 70 due to the outer diameter of the plunger 70 being substantially equal to the inner diameter of the inner body 40A. Such transitioning of the second check valve 74A allows the shaft 60 and the plunger 70 to move through the inner body 40A and towards the bottom end 41B of the inner body 40A at a regulated speed based on the diameters of the second passageway 72, the compression strength of the biaser 78 operably engaged with the ball 77, and the type of material or fluid loaded into the inner body 40A. Moreover, the first check valve 74A of the second dampening assembly 14B transitions to the sealed position due to the material exerting a force in the same direction of the compression force exerted by the biaser 78 on the ball 77.

As the shaft 60 and plunger 70 move towards the bottom end 41B of the inner body 40A, the ball detent 92 of the stabilizing assembly 90 of the second dampening assembly 14B operably engages with the shaft 60 inside of the circumferential groove 64. Such engagement between the shaft 60 and the stabilizing assembly 90 is caused by the pressing force exerted by the plate 12 and the optical instrument 2 being less than the compression strength exerted on the ball detent 92. As such, the ball detent 92 moves outwardly from the casing 91 and into circumferential groove 64 of the shaft 60 causing the shaft 60 to remain stationary inside of the housing 40. The outward horizontal movement of the ball detent 92 is denoted by an arrow labeled "HM2'" in FIG. 6B.

In combination, the first and second dampening assemblies 14A, 14B are considered advantageous at least because the first and second dampening assemblies 14A, 14B apply opposing dampening mechanisms to the optical instrument 2 and the plate 12 by reducing the rotation and movement in two axes. As described above, this dampening mechanism prevents against damaging or impairing electrical components, mechanical components, or other components of the optical instrument 2 during a ballistic event. As described above, any suitable number of dampening assemblies, such as the first and second dampening assemblies 14A, 14B, may be used to dampen and absorb ballistic force from an optical instrument any suitable number of axes.

Figure 7:
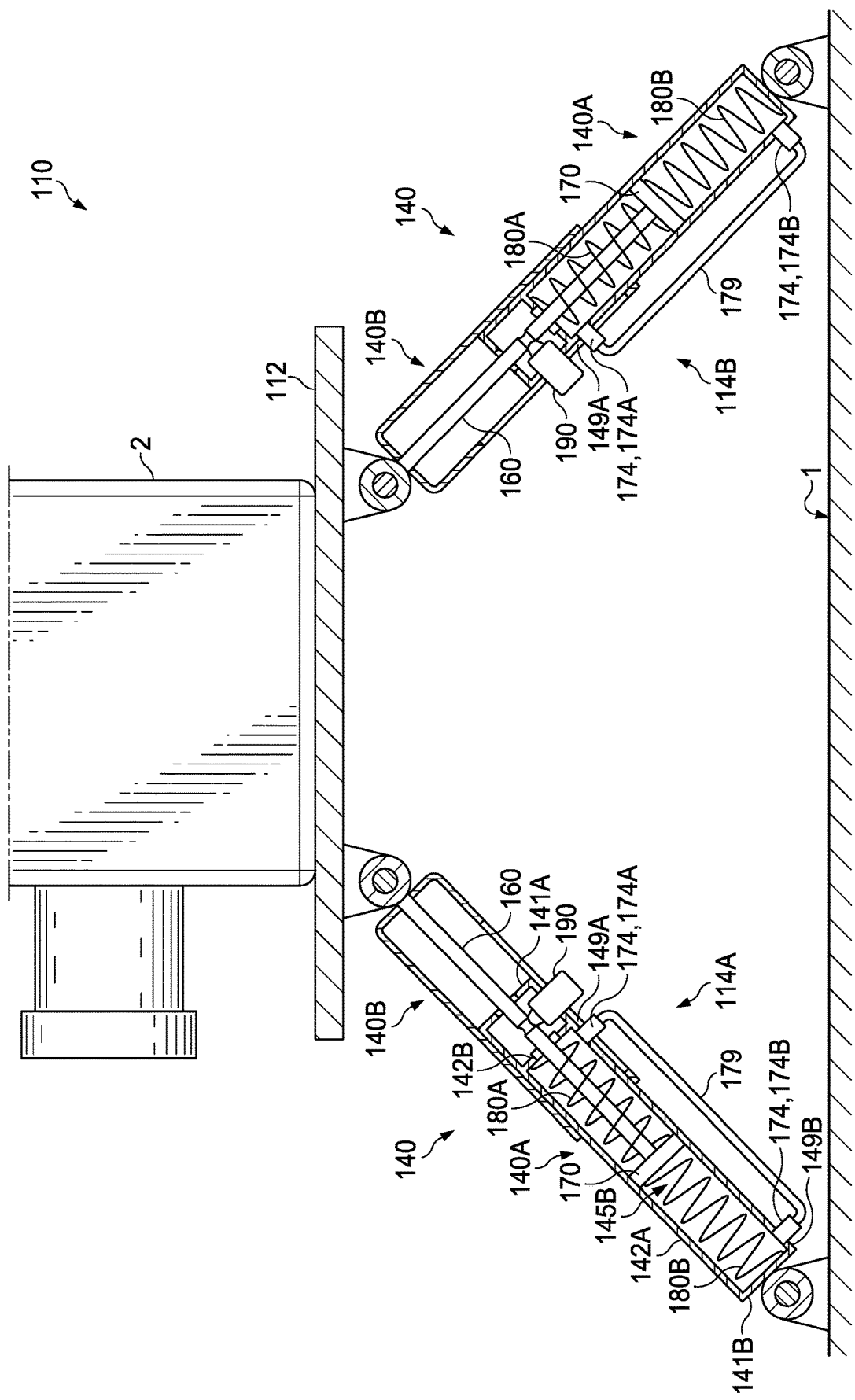
FIG. 7 is a partial cross-sectional view of a plate and first and second dampening assemblies of another apparatus operably engaged with an optical instrument.

FIG. 7 illustrates another apparatus 110. The apparatus 110 is similar to the apparatus 10 described above and illustrated in FIGS. 1-6B, except as detailed below. The apparatus 110 includes a plate 112 that operably engages with an optical instrument, such as optical instrument 2, and at least one dampening assembly 114.

In the illustrated embodiment, the apparatus 110 includes a first dampening assembly 114A and an opposing second dampening assembly 114B. In other exemplary embodiments, any suitable number of dampening assemblies may be used for a single apparatus when dampening the movement and rotation of an optical instrument in more than one axis. Each of the first and second dampening assemblies 114A, 114B has a housing 140, a shaft 160, a plunger 170, at least one spring 180, and at least one stabilizing assembly 190 substantially similar to the first and second dampening assemblies 14A, 14B of the apparatus 10 described above. Additionally, the first and second dampening assemblies 114A, 114B are substantially similar to one another and are engaged with plate 112 in a mirrored-image orientation. Inasmuch as the dampening assemblies 114A, 114B are substantially similar, the following description will relate to the first dampening assembly 114A. It should be understood, however, that the description of the first dampening assembly 114A applies equally to the second dampening assembly 114B.

As illustrated in FIG. 7, the first dampening assembly 114A may include a housing 140 that is substantially similar to the housing 40 described and illustrated above, except as detailed below. The housing 140 includes an inner body 140A and an outer housing 140B. The inner body 140A may have a top end 141A, an opposing bottom end 141B, and a longitudinal axis defined therebetween. The inner body 140A may also have a circumferential wall 142A that extends from the top end 141A to the bottom end 141B and disposed about the longitudinal axis of the inner body 140A. The inner body 140A may also have cross member 142B operably engaged with the circumferential wall 142A interior to the inner body 40A and extends orthogonally to the longitudinal axis of the inner body 140A. As illustrated in FIG. 7, the inner body 140A also defines a lower chamber 145B via the circumferential wall 142A and the cross member 142B that extends between the bottom end 141B of the inner body 140A and the cross member 142B.

Still referring to FIG. 7, the inner body 140A of the first dampening assembly 114A may define an upper inlet 149A that extends entirely through the circumferential wall 142A and is proximate to the cross member 142B. The inner body 140A may also define a lower inlet 149B that extends entirely through the circumferential wall 142A and is proximate to the bottom end 141B of the inner body 140A. Each of the upper inlet 149A and the lower inlet 149B is in fluid communication with the lower chamber 145B of the inner body 140A. Such uses of the upper inlet 149A and the lower inlet 149B are described in more detail below.

Still referring to FIG. 7, the first dampening assembly 114A may include an upper check valve 174A that is operably engaged with the inner body 140A inside of the upper inlet 149A. The first dampening assembly 114A may also include an opposing lower check valve 174B that is operably engaged with the inner body 140A inside of the lower inlet 149B. In this illustrated embodiment, the check valves 174A, 174B are operably engaged with the housing 140 rather than the plunger 170 as described in apparatus 10 in FIGS. 1-6B. In this illustrated embodiment, the upper check valve 174A and the lower check valve 174B may be a two-way check valve for transporting fluid or material above and below the plunger 170 inside of the lower chamber 145B. Any suitable two-way check valve or similar valve may be used herein for transporting fluid or material from a lower chamber and/or into a lower chamber.

Additionally, a conveying member 179 may be operably engaged with the upper check valve 174A and the lower check valve 174B where the upper check valve 174A and the lower check valve 174B are in fluid communication with one another. In the illustrated embodiment, the conveying member 179 may be a conduit or tubing component operably engaged with the upper check valve 174A and the lower check valve 174B. Any suitable conduit, tubing, or similar component may be used herein to operably engage with upper and lower check valves and to provide fluid communication between said upper and lower check valves. In other exemplary embodiments, any suitable number of conveying members may be used depending on various considerations, including the type of the check valve being used in a dampening assembly, the number of check valves provided in a dampening assembly, and other considerations of the like. In one exemplary embodiment, two conveying members may be operably engaged with a one-way check valve for transporting fluid above and below a plunger inside of an inner body. In another exemplary embodiment, at least one conveying member may be operably engaged with a two-way check valve for transporting fluid above and below a plunger inside of an inner body.

During operation, the conveying member 179 may be adapted to transport fluid or material between each of the upper check valve 174A and the lower check valve 174B based on the pressure exerted by the shaft 160 and the plunger 170 during a dampening operation. In one instance, the conveying member 179 may convey fluid or material from lower check valve 174B to the upper check valve 174A when the shaft 160 and plunger 170 collectively exert a downward force towards the bottom end 141B of the inner body 140. In this instance, the fluid or material provided below the plunger 170 flows into the lower check valve 174B (due to the lower check valve 174B moving to an unsealed position based on the material pressure), flows through the conveying member 179, flows through the upper check valve 174A (due to the upper check valve 174A moving to an unsealed position based on the material pressure), and flows into the lower chamber 145B above the plunger 170. As such, a greater amount of material or fluid is provided above the plunger 170. The fluid or material provided in the lower chamber 145B may also flow from the upper check valve 174A to the lower check valve 174B (via the conveying member 179) when the shaft 160 and the plunger 170 collectively exert an upward force directed towards the top end 141A of the inner body 140. As such, a greater amount of material or fluid is provided below the plunger 170.

In the illustrated embodiment, a portion of the upper and lower check valves 174A, 174B and the conveying member 179 are disposed exterior to the lower chamber 145B of the inner body 140A. In other exemplary embodiments, any suitable configuration between upper and lower check valves and a conveying member may be used. In one exemplary embodiment, a portion of upper and lower check valves and a conveying member are disposed interior to a lower chamber of an inner body.

Figure 8:
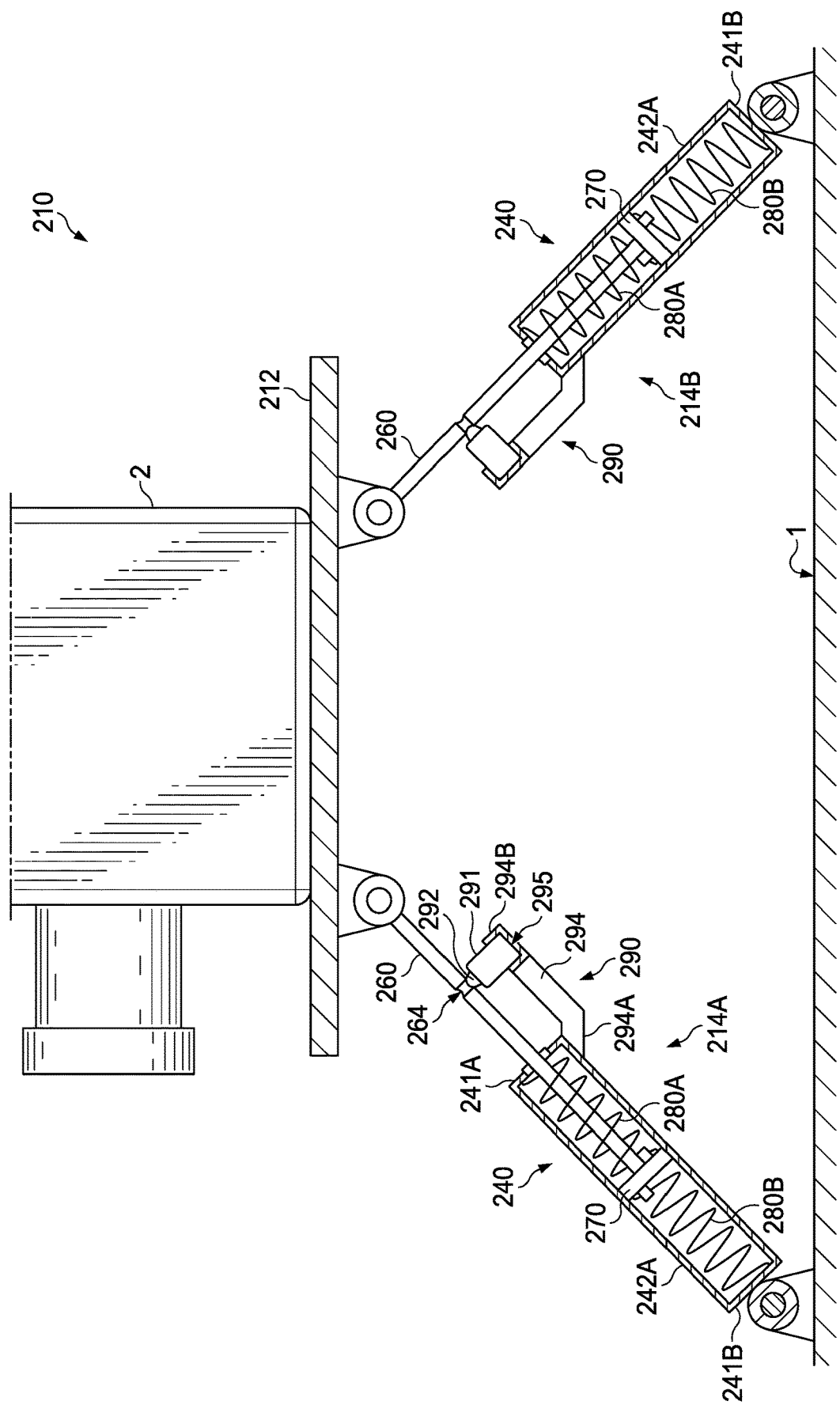
FIG. 8 is a partial cross-sectional view of a plate and first and second dampening assemblies of another apparatus operably engaged with an optical instrument.

FIG. 8 illustrates an another apparatus 210. The apparatus 210 is similar to the apparatus 10 and apparatus 110 described above and illustrated in FIGS. 1-7, except as detailed below. The apparatus 210 includes a plate 212 that operably engages with an optical instrument, such as optical instrument 2, and at least one dampening assembly 214.

In the illustrated embodiment, the apparatus 210 includes a first dampening assembly 214A and an opposing second dampening assembly 214B. In other exemplary embodiments, any suitable number of dampening assemblies may be used for a single apparatus when dampening the movement and rotation of an optical instrument in more than one axis. Each of the first and second dampening assemblies 214A, 214B has a housing 240, a shaft 260, a plunger 270, at least one spring 280, and at least one stabilizing assembly 290 substantially similar to the first and second dampening assemblies 14A, 14B of the apparatus 10 described above. Additionally, the first and second dampening assemblies 214A, 214B are substantially similar to one another and are engaged with plate 212 in a mirrored-image orientation. Inasmuch as the dampening assemblies 214A, 214B are substantially similar, the following description will relate to the first dampening assembly 214A. It should be understood, however, that the description of the first dampening assembly 214A applies equally to the second dampening assembly 214B.

As illustrated in FIG. 8, the first dampening assembly 214A omits the structural configuration of inner and outer bodies for housing 240. Rather, the first dampening assembly 214A uses a single, unibody housing 240 substantially similar to the structural configuration of the inner body 40A described above and illustrated in FIGS. 1-6B. As such, the housing 240 may operate substantially similar to the inner body 40A of the housing 40 as described above. Still referring to FIG. 8, the at least one stabilizing assembly 290 is similar to the stabilizing assemblies 90, 190 as described above, excepted as detailed below. In the illustrated embodiment, a single stabilizing assembly 290 is provided with the first dampening assembly 114A and the second dampening assembly 114B. In other exemplary embodiments, any suitable number of stabilizing assemblies may be provided on a dampening assembly based on various considerations.

Still referring to FIG. 8, the stabilizing assembly 290 is operably engaged with an exterior surface 242A of the housing 240 while still being adapted to maintain the shaft 260 at the neutral position during normal, non-ballistic events. The stabilizing assembly 290 includes a stabilizing arm 294 that is adapted to maintain a casing 291 and a spring-loaded ball detent 292 at a position to stabilize the shaft 260. The stabilizing arm 294 may have a first end 294A that is operably engaged with the housing 240 proximate to a top end 241A of the housing 240A. The stabilizing arm 294 may also have an opposing second end 294B that is operably engaged with the casing 291 inside a cavity 295 defined by the stabilizing arm 294. As such, a portion of the casing 291 may be disposed inside of the cavity 295. While the structural configuration of the stabilizing assembly 290 is different from the structural configuration of the stabilizing assemblies 90, 190, the stabilizing assemblies 90, 190, 290 provide a substantially similar stabilizing mechanism to a shaft during non-ballistic events.

In the embodiments described and illustrated herein, additional structural components and/or assemblies may be provided in any one of the embodiments or all of embodiments.

In one exemplary embodiment, at least one dampening assembly of an apparatus may include a bleeder valve operably engaged to any component of the at least one dampening assembly, including a housing or a plunger. The bleeder valve may be configured to transition from a closed position to an opened position during a high ballistic shock event to allow the plunger of the at least one dampening assembly to return to the neutral position once the high ballistic shock event is concluded. As such, the bleeder valve described above may be included into any of one of the apparatuses 10, 110, 210 described herein or illustrated in FIGS. 1-8.

In another exemplary embodiment, active control systems may be included into check valves and dampening components of an apparatus where the active control systems are adapted to control said check valves and dampening components in response to a ballistic shock input caused by a ballistic device. In other words, the active control systems may dampen and reduce the ballistic shock input via logic devices. As such, the active control systems may include programmable electronic logic controllers, accelerometers, and other devices of the like to control dampening of the apparatus upon receiving a ballistic shock input.

While the apparatus 10 described and illustrated herein is mounted on the platform 1, an apparatus may be operably engaged with a platform is any suitable configuration based on various considerations, including type of platform using at least one apparatus, the overall footprint of the apparatus on a platform, and other various considerations. In one exemplary embodiment, an apparatus may be hung downwardly from a platform. In another exemplary embodiment, an apparatus may be hung laterally off of a side of a platform.

While the first and second dampening assemblies 14A, 14B are operably engaged at a bottom surface 22 of the plate 12 via front and rear brackets 24A, 24B provided on the bottom surface 22, first and second dampening assemblies may be operably engaged along any suitable point or position of a plate. In one exemplary embodiment, first and second dampening assemblies may be operably engaged with a top surface of a plate via front and rear brackets provided on the top surface of the plate. In another exemplary embodiment, first and second dampening assemblies may be operably engaged between top and bottom surfaces of a plate via front and rear brackets provided between the top and bottom surfaces of the plate.

Figure 9:
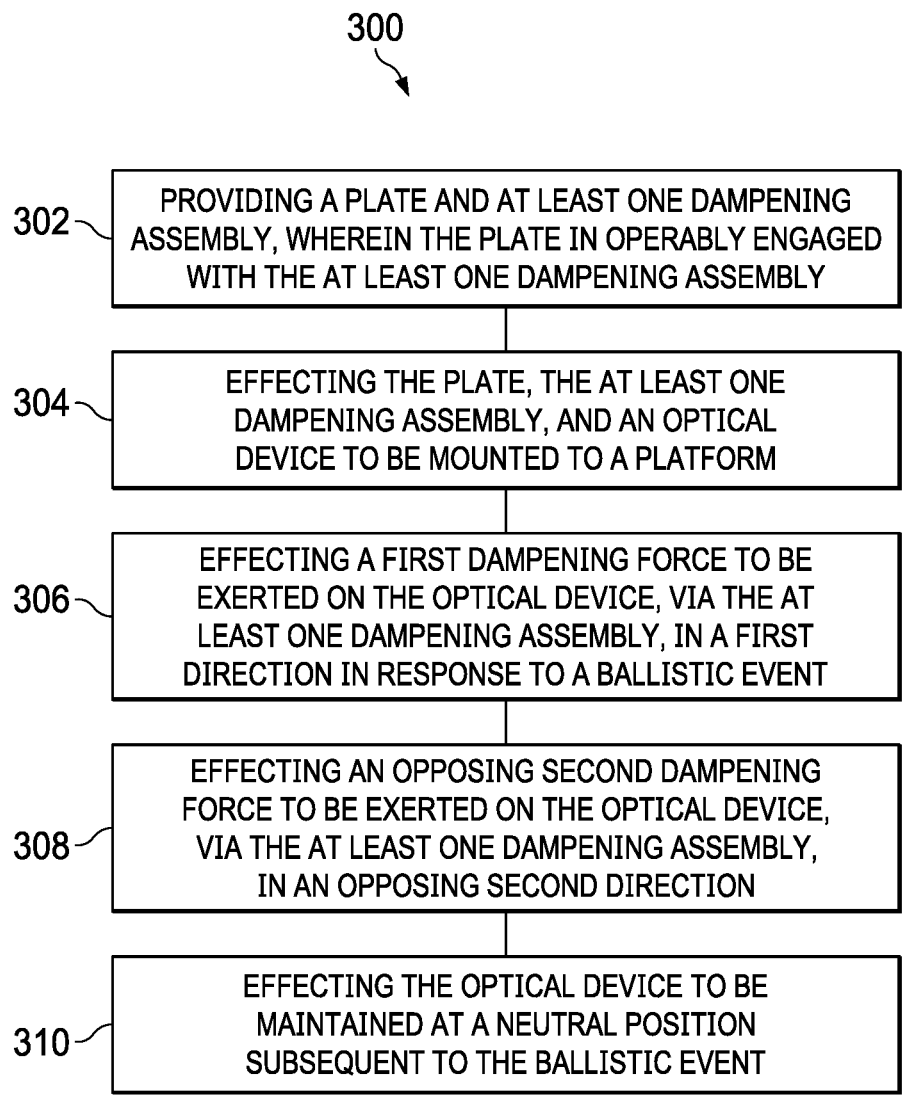
FIG. 9 is an exemplary method flowchart.

FIG. 9 illustrates a method 300. An initial step 302 of method 300 comprises receiving a ballistic force created by a ballistic device on a platform. Another step 304 comprises exerting a first dampening force on the optical device, via at least one dampening assembly, in a first direction. Another step 306 comprises exerting an opposing second dampening force on the optical device, via the at least one dampening assembly, in an opposing second direction. Another step 308 comprises maintaining the optical device at a neutral position subsequent to the ballistic event.

In other exemplary embodiments, method 300 may include additional steps. Optional steps may further comprise exerting a ballistic force on a shaft of the at least one dampening assembly; transitioning a first check valve of a plunger of the at least one dampening assembly from a sealed position to an unsealed position via material disposed inside of a housing of the at least one dampening assembly; moving the shaft from a neutral position to a transitioned position; exerting a first biasing force on the plunger, via at least one biaser, inside of the housing; transitioning a second check valve of the plunger from a sealed position to an unsealed position via material disposed inside of the housing; and moving the shaft from the transitioned position to the neutral position. Optional steps may further comprise exerting a ballistic force on a shaft of the at least one dampening assembly; transitioning a first check valve of a plunger of the at least one dampening assembly from a sealed position to an unsealed position via material disposed inside of a housing of the at least one dampening assembly; moving the shaft from a neutral position to a transitioned position; exerting a first biasing force on the plunger, via a first biaser, inside of the housing for reducing travel of the shaft; transitioning a second check valve of the plunger from a sealed position to an unsealed position via material disposed inside of the housing; and exerting a second biasing force on the plunger, via a second biaser, inside of the housing for readjusting position of shaft; moving the shaft from the transitioned position to the neutral position. Another optional step may further comprise that wherein the step of maintaining the optical device at a neutral position further comprises a stabilizing assembly of the at least one dampening assembly maintaining a shaft of the at least one dampening assembly at the neutral position during non-ballistic events. Optional steps may further comprise exerting a ballistic force on a shaft of the at least one dampening assembly; transitioning a first check valve of a housing of the at least one dampening assembly from a sealed position to an unsealed position via material disposed inside of the housing; moving the shaft from a neutral position to a transitioned position; exerting a first biasing force on the plunger, via a first biaser, inside of the housing for reducing travel of the shaft; transitioning a second check valve of the housing from a sealed position to an unsealed position via material disposed inside of the housing; exerting a second biasing force on the plunger, via a second biaser, inside of the housing for readjusting position of shaft; and moving the shaft from the transitioned position to the neutral position. Optional steps may further comprise exerting a third dampening force on the optical device, via a second dampening assembly, in a third direction; and exerting an opposing fourth dampening force on the optical device, via the second dampening assembly, in an opposing fourth direction.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An apparatus, comprising:
   a plate adapted to hold at least one optical device; and
   at least one dampening assembly having a first end operably engaged with the plate and an opposing second end operably engaged with a platform, the at least one dampening assembly further comprises:
   a housing; and
   wherein the plate further comprises:
     at least one bracket operably engaged with a bottom surface of said plate, wherein the first end of the at least one dampening assembly is operably engaged with the at least one bracket of the plate; and wherein the at least one dampening assembly is rotatable relative to the plate and the platform;
   a shaft having a first end operably engaged with the plate and an opposing second end disposed inside of the housing, wherein the shaft is operably engaged with the housing and is adapted to be moveable relative to the housing;
   a plunger operably engaged with the second end of the shaft, wherein the plunger is adapted to control movement of the shaft inside of the housing via a check valve assembly;
     at least one biaser operably engaged with the housing and the plunger, wherein the at least one biaser is adapted to return the shaft to a neutral position after a ballistic event;
     a stabilizing assembly operably engaged with the housing and the shaft, wherein the stabilizing assembly is adapted to maintain the shaft at the neutral position during non-ballistic events; and
     at least one mount operably engaged with the platform; wherein the second end of the at least one dampening assembly is operably engaged with the at least one mount; and wherein the plate and the at least one dampening assembly are moveable, via a multi-degree joint operably engaging the plate and the at least one dampening assembly, relative to the platform during the ballistic event.

2. The apparatus of claim 1, wherein the valve assembly is adapted to reduce movement of the plate and the at least one optical device in response to a ballistic event generated by a ballistic device on or proximate the platform.

3. The apparatus of claim 2, wherein the check valve assembly further comprises:
   a first check valve operably engaged with a top surface of the plunger, wherein the first check valve is adapted to be moveable from a closed state to an opened state when the shaft is forced towards the plate; and
   an opposing second check valve operably engaged with a bottom surface of the plunger, wherein the second check valve is adapted to be moveable from a closed state to an opened state when the shaft is forced towards the platform.

4. The apparatus of claim 2, wherein the at least one dampening assembly further comprises:
   an opposing second biaser operably engaged with the housing and the plunger, wherein the second biaser is adapted to return the shaft to the neutral position after the ballistic event.

5. The apparatus of claim 4, wherein the at least one biaser is disposed between a first end of the housing and a top surface of the plunger; and
   wherein the second biaser is disposed between an opposing second end of the housing and a bottom surface of the plunger.

6. The apparatus of claim 1, wherein the stabilizing assembly further comprises:
   a support arm operably engaged with an outer surface of the housing; and
   a ball detent mechanism operably engaged with the support arm, wherein the ball detent mechanism is adapted to operably engaged with a groove defined in the shaft to maintain the shaft at the neutral position during non-ballistic events.

7. The apparatus of claim 1, wherein the housing further comprises:
an outer body having a first end and an opposing open second end, wherein the first end of the outer body is operably engaged with the shaft; and
an inner body operably engaged with the outer body; wherein the inner body is adapted to be moveable through the open second end of the outer body and operably engaged with the platform.

8. The apparatus of claim 7, wherein the housing further comprises:
a slot defined in the outer body between the first end and the open second end, wherein the slot is adapted to allow the stabilizing assembly be moveable inside of the slot; and
an aperture defined in the inner body and aligned with the slot, wherein the aperture is adapted to allow the stabilizing assembly to be operably engaged with the inner body.

9. The apparatus of claim 2, wherein the check valve assembly further comprises:
a first check valve operably engaged with a housing at a first inlet defined at a first end of the housing, wherein the first check valve is adapted to be moveable from a sealed state to an unsealed state;
a second check valve operably engaged with the housing at a second inlet defined at a second end of the housing, wherein the second check valve is adapted to be moveable from a sealed state to an unsealed state; and
a conveying member operably engaged with the first check valve and the second check valve, wherein the conveying member is adapted to transfer material between the first check valve and the second check valve based on the position of a plunger inside of the housing.

10. A dampening assembly, comprising:
a housing;
a shaft operably engaged with the housing, wherein the shaft is adapted to be moveable relative to the housing;
a plunger operably engaged with the shaft, wherein the plunger is adapted to control movement of the shaft inside of the housing;
at least one biaser operably engaged with the housing and the plunger, wherein the at least one biaser is adapted to return the shaft to a neutral position after the ballistic event;
a check valve assembly disposed within the housing and adapted to control fluid movement within the housing in response to force from the at least one biaser, wherein the check valve assembly further comprises:
a first check valve operably engaged with a top surface of the plunger, wherein the first check valve is adapted to be moveable from a closed state to an opened state when shaft is forced towards the plate; and
an opposing second check valve operably engaged with a bottom surface of the plunger, wherein the second check valve is adapted to be moveable from a closed state to an opened state when shaft is forced towards the platform; and
a stabilizing assembly operably engaged with the housing and the shaft, wherein the stabilizing assembly is adapted to maintain the shaft at the neutral position during non-ballistic events.

11. The apparatus of claim 10, wherein the check valve assembly further comprises:
a first check valve operably engaged with the housing at a first inlet defined at a first end of the housing, wherein the first check valve is adapted to be moveable from a sealed state to an unsealed state;
a second check valve operably engaged with the housing at a second inlet defined at a second end of the housing, wherein the second check valve is adapted to be moveable from a sealed state to an unsealed state; and
a conveying member operably engaged with the first check valve and the second check valve, wherein the conveying member is adapted to transfer material between the first check valve and the second check valve based on the position of a plunger inside of the housing.

12. A method, comprising:
providing a plate and at least one dampening assembly, wherein the plate is operably engaged with the at least one dampening assembly;
effecting the plate, the at least one dampening assembly, and an optical device to be mounted to a platform;
effecting a first dampening force to be exerted on the optical device, via the at least one dampening assembly, in a first direction in response to a ballistic event;
effecting an opposing second dampening force to be exerted on the optical device, via the at least one dampening assembly, in an opposing second direction;
effecting the optical device to be maintained at a neutral position subsequent to the ballistic event;
effecting a ballistic force to be exerted on a shaft of the at least one dampening assembly;
effecting a first check valve of a plunger of the at least one dampening assembly to transition from a sealed position to an unsealed position via material disposed inside of a housing of the at least one dampening assembly;
effecting the shaft to move from a neutral position to a transitioned position;
effecting a first biasing force to be exerted on the plunger, via at least one biaser, inside of the housing;
effecting a second check valve of the plunger to transition from a sealed position to an unsealed position via material disposed inside of the housing; and
effecting the shaft to move from the transitioned position to the neutral position.

13. The method of claim 12, further comprising:
effecting a ballistic force to be exerted on a shaft of the at least one dampening assembly;
effecting a first check valve of a plunger of the at least one dampening assembly to transition from a sealed position to an unsealed position via material disposed inside of a housing of the at least one dampening assembly;
effecting the shaft to move from a neutral position to a transitioned position;
effecting a first biasing force to be exerted on the plunger, via a first biaser, inside of the housing for reducing travel of the shaft;
effecting a second check valve of the plunger to transition from a sealed position to an unsealed position via material disposed inside of the housing;
effecting a second biasing force to be exerted on the plunger, via a second biaser, inside of the housing for readjusting position of shaft; and
effecting the shaft to move from the transitioned position to the neutral position.

14. The method of claim 12, wherein the step of effecting the optical device to be maintained at a neutral position subsequent to the ballistic event further comprises a stabilizing assembly of the at least one dampening assembly maintaining a shaft of the at least one dampening assembly at the neutral position during non-ballistic events.

15. The method of claim 12, further comprising:
effecting a ballistic force to be exerted on a shaft of the at least one dampening assembly;
effecting a first check valve of a housing of the at least one dampening assembly to transition from a sealed position to an unsealed position via material disposed inside of the housing;
effecting the shaft to move from a neutral position to a transitioned position;
effecting a first biasing force to be exerted on the plunger, via a first biaser, inside of the housing for reducing travel of the shaft;
effecting a second check valve of the housing to transition from a sealed position to an unsealed position via material disposed inside of the housing;
effecting a second biasing force to be exerted on the plunger, via a second biaser, inside of the housing for readjusting position of shaft; and
effecting the shaft to move from the transitioned position to the neutral position.

16. The method of claim 12, further comprising:
effecting a third dampening force to be exerted on the optical device, via a second dampening assembly, in a third direction; and
effecting an opposing fourth dampening force to be exerted on the optical device, via the second dampening assembly, in an opposing fourth direction.

* * * * *